/

US006567409B1

United States Patent
Tozaki et al.

(10) Patent No.: US 6,567,409 B1
(45) Date of Patent: May 20, 2003

(54) DATA STREAM CONVERTING APPARATUS

(75) Inventors: Akihiro Tozaki, Saitama-ken (JP); Masao Higuchi, Saitama-ken (JP); Seiji Harada, Saitama-ken (JP)

(73) Assignee: Pioneer Electronics Corporation, Tokyo-to (JP)

( * ) Notice: Subject to any disclaimer, the term of this patent is extended or adjusted under 35 U.S.C. 154(b) by 0 days.

(21) Appl. No.: 09/287,643

(22) Filed: Apr. 7, 1999

(30) Foreign Application Priority Data

Apr. 8, 1998 (JP) .......................................... 10-096445

(51) Int. Cl.$^7$ .............................................. H04L 12/28
(52) U.S. Cl. .................................. 370/395.64; 370/465
(58) Field of Search .......................... 370/395.64, 465, 370/466, 467, 470, 471, 472, 527, 536, 546; 341/50, 51; 348/14.13; 386/12, 27; 725/91, 93, 97

(56) References Cited

U.S. PATENT DOCUMENTS

| 6,055,271 A | * | 4/2000 | Yasuda et al. ............... 375/240 |
| 6,181,706 B1 | * | 1/2001 | Anderson et al. ........... 370/412 |
| 6,211,800 B1 | * | 4/2001 | Yanagihara et al. .......... 341/50 |
| 6,289,169 B1 | * | 9/2001 | Okuyama .................... 386/83 |

* cited by examiner

*Primary Examiner*—Alpus H. Hsu
*Assistant Examiner*—Thien Tran

(74) *Attorney, Agent, or Firm*—Young & Thompson

(57) ABSTRACT

The apparatus for converting a first data stream supplied from a first buffer for accumulating the first data stream into a second data stream, and supplying the second data stream to a second buffer for accumulating the second data stream, is provided. The first data stream includes a plurality of first data groups each including significant data. Further, the first data stream includes a plurality of time values each indicating a point of time corresponding to a position of respective one of the plurality of first data groups within the first data stream. The apparatus includes: a first determining device for determining a first amount of the first data stream accumulated in the first buffer on the basis of at least one of the plurality of time values; a second determining device for determining a second amount of the second data stream accumulated in the second buffer on the basis of an amount of the second data stream that is supplied to the second buffer; a calculation device for calculating a difference between the first amount and the second amount by subtracting the second amount from the first amount; a first placing device for placing the significant data extracted from the first data stream supplied from the first buffer, into the second data stream, if the difference is smaller than a predetermined value; and a second placing device for placing an additional data into the second data stream, if the difference is not smaller than the predetermined value.

10 Claims, 24 Drawing Sheets

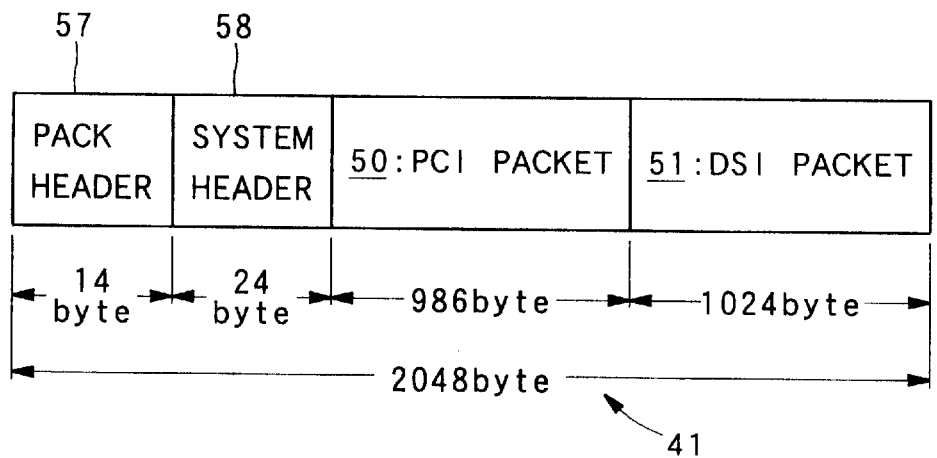
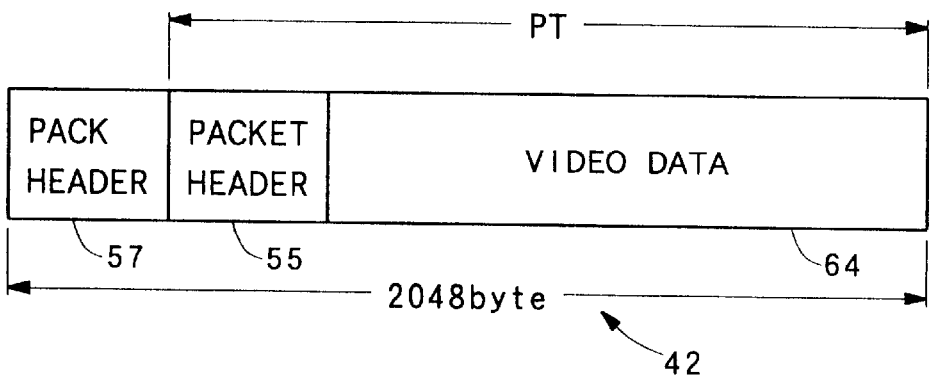
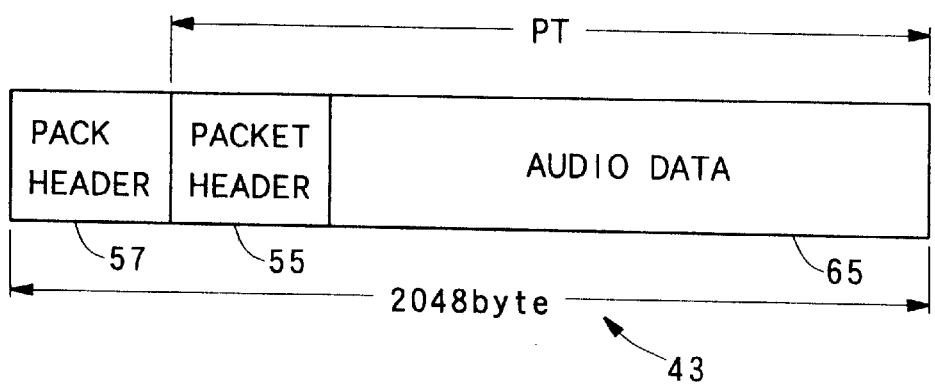

FIG. 12

| Field | Number of bits | Number of bytes | Value |
|---|---|---|---|
| Sync byte | 8 | 1 | 0x47 |
| Transport error indicator | 1 | | 0 |
| Payload unit start indicator | 1 | | 0,1 |
| Transport priority | 1 | | 0 |
| PID | 13 | 2 | |
| Transport scrambling control | 2 | | 00 |
| Adaptation field control | 2 | | 01,11 |
| Continuity counter | 4 | 1 | |
| Adaptation field length | 8 | 1 | 0-182 |
| Discontinuity indicator | 1 | | 0 |
| Random access indicator | 1 | | 0,1 |
| Elementary stream priority indicator | 1 | | 0 |
| PCR flag | 1 | | 0 |
| OPCR flag | 1 | | 0 |
| Splicing point flag | 1 | | 0 |
| Transport private data flag | 1 | | 0 |
| Adaptation field extension flag | 1 | 1 | 0 |
| Stuffing byte | 8 × 182 | 182 | 0xFF |

FIG. 13

| Field | Number of bits | Number of bytes | Value |
|---|---|---|---|
| Sync byte | 8 | 1 | 0x47 |
| Transport error indicator | 1 | | 0 |
| Payload unit start indicator | 1 | | 0 |
| Transport priority | 1 | | 0 |
| PID | 13 | 2 | 0x1FFF |
| Transport scrambling control | 2 | | 00 |
| Adaptation field control | 2 | | 01 |
| Continuity counter | 4 | 1 | |
| Data byte | 8 × 184 | 184 | |

FIG. 14

| Field | Number of bytes | Number of bytes | Value |
|---|---|---|---|
| Sync byte | 8 | 1 | 0x47 |
| Transport error indicator | 1 | | 0 |
| Payload unit start indicator | 1 | | 0 |
| Transport priority | 1 | | 0 |
| PID | 13 | 2 | |
| Transport scrambling control | 2 | | 00 |
| Adaptation field control | 2 | | 10 |
| Continuity counter | 4 | 1 | |
| Adaptation field length | 8 | 1 | 183 |
| Discontinuity indicator | 1 | | 0,1 |
| Random access indicator | 1 | | 0 |
| Elementary stream priority indicator | 1 | | 0 |
| PCR flag | 1 | | 1 |
| OPCR flag | 1 | | 0 |
| Splicing point flag | 1 | | 0 |
| Transport private data flag | 1 | | 0 |
| Adaptation field extension flag | 1 | 1 | 0 |
| Program clock reference base | 33 | | |
| Reserved | 6 | | 111111 |
| Program clock reference extension | 9 | 6 | |
| Stuffing byte | 8 × 176 | 176 | 0xFF |

FIG. 15

| Field | Number of bits | Number of bytes | Value |
|---|---|---|---|
| Sync byte | 8 | 1 | 0x47 |
| Transport error indicator | 1 | | 0 |
| Payload unit start indicator | 1 | | 1 |
| Transport priority | 1 | | 0 |
| PID | 13 | 2 | 0x0000 |
| Transport scrambling control | 2 | | 00 |
| Adaptation field control | 2 | | 01 |
| Continuity counter | 4 | 1 | |
| Pointer field | 8 | 1 | 0x00 |
| Table id | 8 | 1 | 0x00 |
| Section syntax indicator | 1 | | 1 |
| '0' | 1 | | 0 |
| Reserved | 2 | | 11 |
| Section length | 12 | 2 | 0x00D |
| Transport stream id | 16 | 2 | 0x0000 |
| Reserved | 2 | | 11 |
| Version number | 5 | | 00000 |
| Current next indicator | 1 | 1 | 1 |
| Section number | 8 | 1 | 0x00 |
| Last section number | 8 | 1 | 0x00 |
| Program number | 16 | 2 | |
| Reserved | 3 | | 111 |
| Program map PID | 13 | 2 | |
| CRC 32 | 32 | 4 | |
| "0xFF" | 8 × 168 | 168 | 0xFF |

FIG. 16

| Field | Number of bits | Number of bytes | Value | Comment |
|---|---|---|---|---|
| Sync byte | 8 | 1 | 0x47 | |
| Transport error indicator | 1 | | 0 | |
| Payload unit start indicator | 1 | | 1 | |
| Transport priority | 1 | | 0 | |
| PID | 13 | 2 | | |
| Transport scrambling control | 2 | | 00 | |
| Adaptation field control | 2 | | 01 | |
| Continuity counter | 4 | 1 | | |
| Pointer field | 8 | 1 | 0x00 | |
| Table PID | 8 | 1 | 0x02 | |
| Section syntax indicator | 1 | | 1 | |
| '0' | 1 | | 0 | |
| Reserved | 2 | | 11 | |
| Section length | 12 | 2 | 0x3C | |
| Program number | 16 | 2 | | |
| Reserved | 2 | | 11 | |
| Version number | 5 | | 00000 | |
| Current next indicator | 1 | 1 | 1 | |
| Section number | 8 | 1 | 0x00 | |
| Last section number | 8 | 1 | 0x00 | |
| Reserved | 3 | | 111 | |
| PCR PID | 13 | 2 | | |
| Reserved | 4 | | 1111 | |
| Program info length | 12 | 2 | 0x00E | |
| Descriptor tag | 8 | 1 | 0x05 | P.Identifier |
| Descriptor length | 8 | 1 | 0x04 | |
| Format identifier | 32 | 4 | 0x47413974 | |
| Descriptor tag | 8 | 1 | 0x16 | P.S.buffer |
| Descriptor length | 8 | 1 | 0x06 | |
| Reserved | 2 | | 11 | |
| Sb leak rate | 22 | 3 | 0x00BD5B | |
| Reserved | 2 | | 11 | |
| Sb leak rate | 22 | 3 | 0x000800 | |

FIG. 17

| Field | Number of bits | Number of bytes | Value | Comment |
|---|---|---|---|---|
| Stream type | 8 | 1 | 0x02 | Video |
| Reserved | 3 | | 111 | |
| Elementary PID | 13 | 2 | 0 | |
| Reserved | 4 | | 1111 | |
| ES info length | 12 | 2 | 0x003 | |
| Descriptor tag | 8 | 1 | 0x06 | D.S.Allignment |
| Descriptor length | 8 | 1 | 0x01 | |
| Alignment type | 8 | 1 | 0x02 | |
| Stream type | 8 | 1 | 0x81 | Audio |
| Reserved | 3 | | 111 | |
| Elementary PID | 13 | 2 | 0x0014 | |
| Reserved | 4 | | 1111 | |
| ES info length | 12 | 2 | 0x00F | |
| Descriptor tag | 8 | 1 | 0x05 | AES.Identifier |
| Descriptor length | 8 | 1 | 0x04 | |
| Format identifier | 32 | 4 | 0x4143 2D33 | |
| Descriptor tag | 8 | 1 | 0x81 | AC-Audio |
| Descriptor length | 8 | 1 | 0x07 | |
| Sample rate code | 3 | | 000 | |
| bsid | 5 | 1 | 01000 | |
| Bit rate code | 6 | | 001110 | |
| Surround mode | 2 | 1 | 00 | |
| bsmod | 3 | | 000 | |
| Num channel | 4 | | 0000 | |
| Full svc | 1 | 1 | 1 | |
| Langoode | 8 | 1 | 0x00 | |
| Langoode2 | 8 | 1 | 0x00 | |
| mainid | 3 | | 000 | |
| reserved | 5 | 1 | 11111 | |
| Textlen | 7 | | 0x00 | |
| Text code | 1 | 1 | 0 | |
| Stream type | 8 | 1 | 0x06 | Data |
| Reserved | 3 | | 111 | |
| Elementary PID | 13 | 2 | | |
| Reserved | 4 | | 1111 | |
| ES info length | 12 | 2 | 0x000 | |
| CRC 32 | 32 | 4 | | |
| "0xFF" | 8×120 | 120 | 0xFF | |

DATA STREAM CONVERTING APPARATUS

BACKGROUND OF THE INVENTION

1. Field of the Invention

The present invention relates to a data stream converting apparatus which can convert the structure of a data stream, maintaining its content, and more particularly to a data stream converting apparatus which can convert a program stream into a transport stream.

2. Description of the Related Art

The DVD, which has a large amount of capacity compared with some conventional other optical disks, is becoming popular. The DVD uses a data compression technique standardized by MPEG2 (Moving Picture Experts Group 2, ISO13818-1). When recording multiplexed audio and picture information onto the DVD, this information is recorded in the form of a program stream. The program stream (referred to as a "PS", hereinafter) is a type of data stream standardized by MPEG2.

The PS is suitable for recording a signal program containing audio and picture information onto a recording medium. However, if the audio and picture information is transmitted in communication systems or broadcasting systems, a transport stream is suitably used rather than the program stream. The transport stream (referred to as a "TS", hereinafter) is also a type of data stream standardized by MPEG2, and it is suitable for transmitting a plurality of programs. For example, a data transmission using the TS may be appropriately used in ATV (Advance Television).

In order to transmit the audio and picture information recorded on the DVD as the program stream to another television directly, it is needed to convert the PS into the TS.

However, the PS and TS are different from each other in structure. Further, both recording using the PS and transmission using the TS require very accurate time management. Therefore, converting the PS into the TS requires accurate and complicated processes.

For example, if the audio and picture information is reproduced by decoding the program stream, and thereafter, the transport stream is newly generated by rearranging the decoded audio and picture information, the TS is finally obtained. However, these processes are very complicated. Further, since the decoding and rearranging are continuously carried out, the quality of sound and picture can be degraded. Further, in rearranging the audio and picture information, it is needed to rewrite time management information, such as a PTS (Presentation Time Stamp) and a DTS (Decoding Time Stamp). The rewriting such time management information requires exact management of the amount of data, accurate measurement of time periods, etc.

SUMMARY OF THE INVENTION

It is therefore an object of the present invention to provide a data stream conversion apparatus which can efficiently convert a data stream such as the program stream into a second data stream such as the transport steam without complicated processes.

In accordance with an aspect of the present invention, a first data stream conversion apparatus is an apparatus for converting a first data stream supplied from a first buffer for accumulating the first data stream into a second data stream, and supplying the second data stream to a second buffer for accumulating the second data stream. The first data stream includes a plurality of first data groups. Each of the plurality of first data groups includes significant data. Further, the first data stream includes a plurality of time values. The plurality of time values each indicates a point of time corresponding to a position of respective one of the plurality of first data groups within the first data stream, The transfer rate of the second data stream is higher than that of the first data stream.

The apparatus includes: a first determining device for determining a first amount of the first data stream accumulated in the first buffer on the basis of at least one of the plurality of time values; a second determining device for determining a second amount of the second data stream accumulated in the second buffer on the basis of an amount of the second data stream that is supplied to the second buffer; a calculation device for calculating a difference between the first amount and the second amount by subtracting the first amount from the second amount; a first placing device for placing the significant data extracted from the first data stream supplied from the first buffer, into the second data stream, if the difference is smaller than a predetermined value; and a second placing device for placing an additional data into the second data stream, if the difference is not smaller than the predetermined value.

In this apparatus, the first determining device determines the first amount of the first data stream accumulated in the first buffer on the basis of at least one of the plurality of time values. The second determining device determines the second amount of the second data stream accumulated in the second buffer on the basis of an amount of the second data stream that is supplied to the second buffer. The calculation device calculates the difference between the first amount and the second amount by subtracting the first amount from the second amount.

If the difference is smaller than a predetermined value, the first placing device places the significant data extracted from the first data stream supplied from the first buffer, into the second data stream. That is, if the amount of data accumulated in the second buffer is not sufficiently greater than the amount of data accumulated in the first buffer, the significant data is sent from the first data stream to the second data stream.

On the other hand, if the difference is not smaller than the predetermined value, the second placing device for placing an additional data into the second data stream. That is, if the amount of data accumulated in the second buffer is sufficiently greater than the amount of the data accumulated in the first buffer, the additional data is placed into the second data stream, in stead of placing the significant data. In addition, it is preferable that the amount of the additional data is much smaller than that of the significant data.

If sending the significant data from the first data steam to the second data stream, the amount of the data accumulated in the first buffer decreases, while the amount of the data accumulated in the second buffer increases. If the amount of the data accumulated in the second buffer is not sufficiently greater than that in the first buffer, there is a possibility that lack of data occurs in the second buffer, because the transfer rate of the second data stream is higher than that of the first data stream.

To prevent such a situation, the apparatus observes both the amount of data accumulated in the first buffer and the amount of data accumulated in the second buffer, and then recognizes the difference between these two amounts, and then sends significant data from the first data stream to the second data stream when the amount of data accumulated in the second buffer is not sufficiently greater than that in the first buffer.

Accordingly, the state that the amount of data accumulated in the second buffer is sufficiently greater than that in the first buffer is maintained. Therefore, it is prevented that lack of data occurs in the second buffer. Thus, the first data stream can be converted into the second data stream without occurrence of lack of data in the second buffer. Therefore, it can be prevented that the converting operation is suspended due to occurrence of lack of data in the second buffer.

Further, when the amount of data accumulated in the second buffer is sufficiently greater than that in the first buffer, the additional data is placed into the second data stream. Therefore, the first data stream can be converted into the second data stream without rearranging the data stream or changing the contents of the significant data. If time management information is included in the significant data, it is not necessary to rewrite this. Accordingly, the conversion of data stream can be achieved without complicated processes.

In the apparatus, the first determining device may include: an extraction device for extracting one of the plurality of time values from the first data stream supplied from the first buffer; a time measuring device for measuring an elapsed time from a point of time at which the extraction device extracts the time value; and an amount calculation device for calculating the first amount by using the extracted time value and the measured elapsed time. Therefore, the first amount can be calculated effectively.

Further, the second determining device may include a storing device for storing a value representing the amount of the second data stream that is supplied to the second buffer. Therefore, the second amount can be determined by using the value stored in the storing device.

In accordance with another aspect of the present invention, another data stream converting apparatus is an apparatus for converting a program stream supplied from a first buffer for accumulating the program stream into a transport stream, and supplying the transport stream to a second buffer for accumulating the transport stream. Both the program stream and the transport stream are standardized by MPEG2 (Moving Picture Experts Group 2). The program stream includes a plurality of first data groups. The program stream includes a plurality of first packets. Each of the plurality of first packets includes significant data. The program stream includes a plurality of SCRs (System Clock References). The transport stream includes a plurality of second packets and a plurality of information packets. The apparatus includes: a first determining device for determining a first amount of the program stream accumulated in the first buffer on the basis of at least one of the plurality of SCRs; a second determining device for determining a second amount of the transport stream accumulated in the second buffer on the basis of an amount of the transport stream that is supplied to the second buffer; a calculation device for calculating a difference between the first amount and the second amount by subtracting the first amount from the second amount; a first placing device for placing the significant data extracted from the program stream supplied from the first buffer, into one of the plurality of second packets in the transport stream, if the difference is smaller than a predetermined value; and a second placing device for placing one of the plurality of information packets into the transport stream, if the difference is not smaller than the predetermined value.

In this apparatus, the first determining device determines the first amount of the program stream accumulated in the first buffer on the basis of at least one of the plurality of SCRs. The second determining device determines the second amount of the transport stream accumulated in the second buffer on the basis of an amount of the transport stream that is supplied to the second buffer. The calculation device calculates the difference between the first amount and the second amount by subtracting the first amount from the second amount.

If the difference is smaller than a predetermined value, the first placing device places the significant data extracted from the program stream supplied from the first buffer, into one of the second packets in the transport stream. That is, if the amount of data accumulated in the second buffer is not sufficiently greater than the amount of data accumulated in the first buffer, the significant data is sent from the program stream to the transport data stream.

On the other hand, if the difference is not smaller than the predetermined value, the second placing device for placing the information packet into the transport stream. That is, if the amount of data accumulated in the second buffer is sufficiently greater than the amount of the data accumulated in the first buffer, the information packet is placed into the transport stream, in stead of sending the significant data to the transport stream.

If sending the significant data from the program steam to the transport stream, the amount of the data accumulated in the first buffer decreases, while the amount of the data accumulated in the second buffer increases. If the amount of the data accumulated in the second buffer is not sufficiently greater than that in the first buffer, there is a possibility that lack of data occurs in the second buffer, because the transfer rate of the transport stream is higher than that of the program data stream.

To prevent such a situation, the apparatus observes both the amount of data accumulated in the first buffer and the amount of data accumulated in the second buffer, and then recognizes the difference between these two amounts, and then sends significant data from the program stream to the transport stream when the amount of data accumulated in the second buffer is not sufficiently greater than that in the first buffer.

Accordingly, the state that the amount of data accumulated in the second buffer is sufficiently greater than that in the first buffer is maintained. Therefore, it is prevented that lack of data occurs in the second buffer. Thus, the program stream can be converted into the transport stream without occurrence of lack of data in the second buffer. Therefore, it can be prevented that the converting operation is suspended due to occurrence of lack of data in the second buffer.

Further, when the amount of data accumulated in the second buffer is sufficiently greater than that in the first buffer, the information packet is placed into the transport stream. Therefore, the program stream can be converted into the transport stream without rearranging the data stream or changing the contents of the significant data. If time management information such as PTS, DTS or the like is included in the significant data, it is not necessary to rewrite this. Accordingly, the conversion of data stream can be achieved without complicated processes.

In this apparatus, the first determining device may include: an extraction device for extracting one of the plurality of SCRs from the program stream supplied from the first buffer; a time measuring device for measuring an elapsed time from a point of time at which the extraction device extracts the SCR; and an amount calculation device for calculating the first amount by using the extracted SCR and the measured elapsed time. Therefore, the first amount can be effectively determined.

Further, the second determining device may include a storing device for storing a value representing the amount of the second data stream that is supplied to the second buffer. Therefore, the second amount can be effectively determined by using the value stored in the storing device.

In the second apparatus, the predetermined value Bx may be within a range of:

$$(Rps/Rts) \cdot (Sp \cdot N) \leq Bx \leq C,$$

where the Rps denotes a transfer rate of the program stream, the Rts denotes a transfer rate of the transport stream, the Sp denotes a size of the second packet, the N denotes a predetermined number, and the C denotes a capacity of the second buffer.

The lower limit of the difference Bx is given as:

(Rps/Rts)·(Sp·N).

If the amount of data accumulated in the second buffer is greater than that in the first buffer, and if the difference between the amount of data accumulated in the first buffer and that in the second buffer is greater than this lower limit, the possibility that lack of data occurs in the second buffer is extremely low.

The high limit of the difference Bx is "C". If the difference between the amount of data accumulated in the first buffer and that in the second buffer is equal to or smaller than this upper limit, the possibility that excess of data occurs in the second buffer is extremely low.

Accordingly, it can be prevented that both lack of data and excess of data occur in the second buffer. Therefore, the program stream can be converted into the transport steam without lack of data or excess of data in the second buffer.

In the second apparatus, any one of the plurality of information packets may include a PAT (Program Association Table). Furthermore, any one of the plurality of information packets may include a PMT (Program Map Tables). The packet including PAT or PMT can be added to the transport stream without rearranging the data stream or changing the contents of the significant data.

Moreover, any one of the plurality of information packets may include insignificant data. Therefore, the program stream can be converted into the transport stream without rearranging the data stream or changing the contents of the significant data.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 3A is a diagram showing a navi pack in the data stream;

FIG. 3B is a diagram showing a video pack in the data stream;

FIG. 3C is a diagram showing an audio pack in the data stream;

FIGS. 12 through 17 are diagrams each showing typical data to be placed into TS packets;

DETAILED DESCRIPTION OF THE PREFERRED EMBODIMENTS

Figure 1:
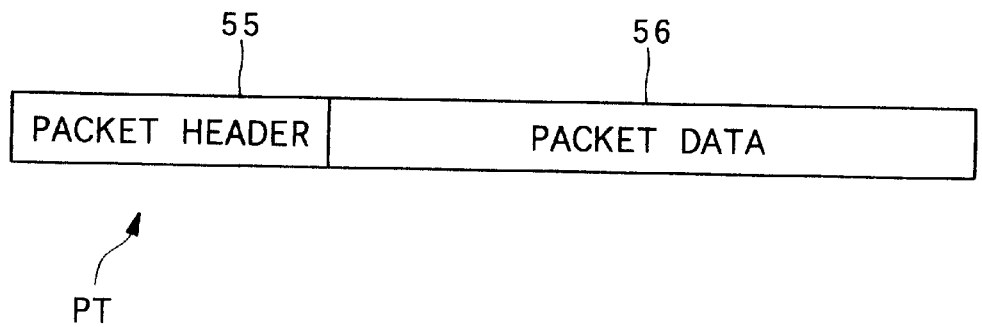
FIG. 1A is a diagram showing a packet in a data stream.
FIG. 1B is a diagram showing a pack in the data stream.
Figure 1:
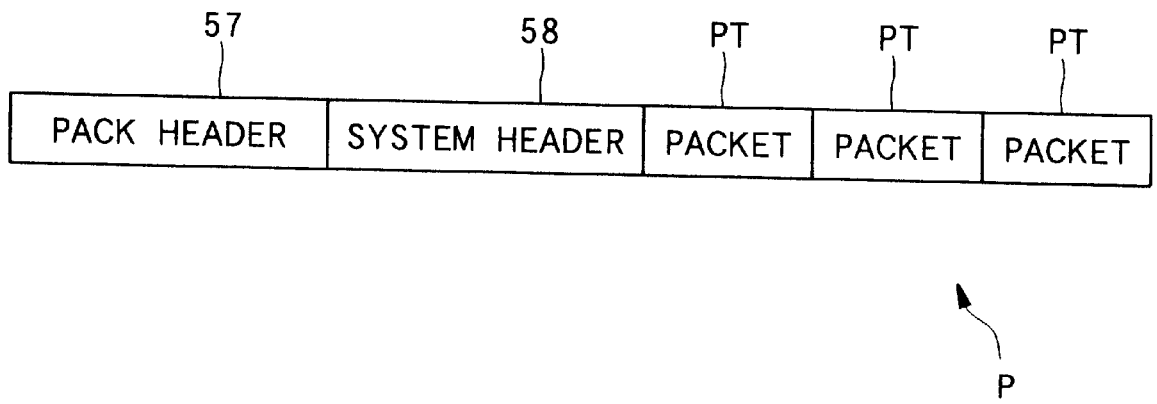

Referring to the accompanying drawings, embodiments of the present invention will be described. In the description set forth hereinafter, the present invention is adapted to an apparatus which can achieve to reproduce and display audio and visual information formed by a program stream, which is reproduced from a DVD, with a television designed to reproduce and display audio and visual information formed by a transport stream.

I. Program Stream (PS) and Transport Stream (TS)

Referring to FIGS. 1 through 5, the standard related to a program stream and transport stream will be described.

The PS and TS are standardized by MPEG2. The structures of both the PS and TS are based on a PES (Packetized Elementary Stream). The PES is packetized into a plurality of PES packets.

FIG. 1A shows the structure of the PES packet PT (referred to as a "packet PT", hereinafter). The packet PT is composed of a PES packet header 55 and PES packet data 56. The PES packet data 56 includes image data or audio data representing images or sound to be actually reproduced. The PES packet header 55 includes: a stream ID for identifying the type of PES packet data 56; a PTS (Presentation Time Stamp); a DTS (Decoding Time Stamp); and other data standardized by the DVD standards or MPEG2.

The DTS is time information representing a time at which decoded picture data is output from a buffer installed in a decoder for decoding a data stream, and it is produced on the basis of a clock with a frequency of 90 kHz. The PTS is time information representing a time at which the image corresponding to the decoded picture data is actually displayed, and it is produced on the basis of a clock with a frequency of 90 kHz. If the PES packet data 56 includes only audio data, the PTS is included in the PES packet header 55, but the DTS is not included in it, since the value of the DTS is the same as that of the PTS with regard to the PES packet data 56 including audio data only. Furthermore, the PTS and DTS are included in the PES packet header 55, only when the head of an access unit is present in the PES packet data 56. The access unit means a picture concerning image data, and it means an AAU (Audio Access Unit) concerning audio data. In addition, the access unit concerning image data (i.e., a picture) is referred to as a "video access unit". Depending on the presence or absence of the DTS, PTS or other optional data, the length (the number of bits or bytes) of the PES packet header 55 is varied.

Basically, the standard data stream in MPEG2 is formed by connecting a plurality of packets PT shown in FIG. 1A and other additional information.

Meanwhile, the PS is a kind of standard data stream in MPEG2. The PS is formed by a plurality of packs. FIG. 1B shows the typical structure of a pack P in the PS. The pack P in the PS includes a pack header 57, a system header 58, and one or a plurality of packets PT. The pack header 57 includes an SCR (System Clock Reference). The DVD standards or MPEG2 requires that the SCR is placed into the PS at 0.7 milliseconds or less than 0.7 milliseconds intervals. The SCR is time information representing a time at which a pack P including the SCR arrives in a buffer installed in a decoder, and it is produced on the basis of a clock with a frequency of 90 kHz. More specifically, the SCR represents a time to determine a reading start time point on a reproduction time base, in order to control a time at which an input of data included in each pack P into the buffer should be started.

The length of the pack header 57 is equal to the sum of 14 bytes and the number of bits of dummy data.

The system header 58 includes information representing the capacity of the buffer in the decoder, etc. The system header 58 may not be always contained in the pack P. Insertion of the system header 58 may be determined at the discretion of a manufacture. If the system header 58 is inserted into the pack P, the system header 58 is placed immediately after the pack header 57.

Figure 2:
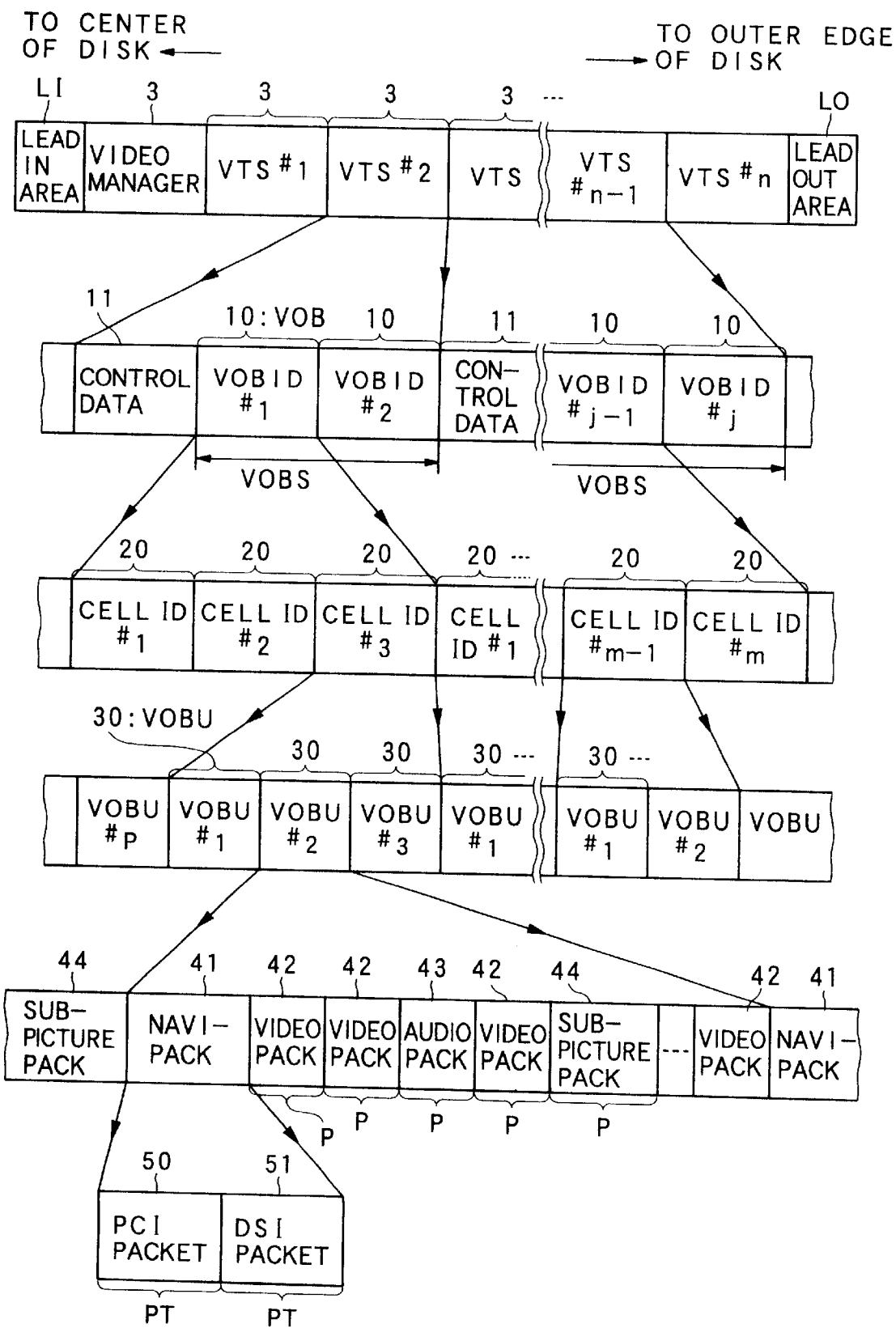
FIG. 2 is a diagram showing a structure of a program stream recorded on a DVD.

Referring to FIG. 2, a physical recording format of a DVD will be described. FIG. 2 shows a physical recording format of a DVD. The PS containing a plurality of packs P is recorded on a DVD. That is, the PS is used as a data stream of a DVD.

As shown in FIG. 2, a lead-in area LI and a lead-out area LO are located at the innermost portion and at the outermost portion on a DVD 1, respectively. Between the lead-in area LI and the lead-out area LO, picture information and audio information are recorded. The picture information and audio information are divided into a plurality of VTSs (Video Title Sets) 3. Identification numbers (IDs) are allocated to the respective VTSs 3 (VTS#1 though VTS#n). Accordingly, the PS is composed of the VTSs 3 and a video manager 2.

The VTS 3 is a set collecting titles related to each other. For example, picture information, audio information and sub picture information composing a specified title (e.g., a motion picture) are contained in one set.

The video manager 2 is recorded at the head portion of the area in which the VTSs 3 are recorded. For example, a menu of titles, information to prevent illegal copy, access tables which make it possible to access each title, and other information necessary for managing picture information and audio information recorded on the DVD 1.

Each VTS 3 is divided into a control data 11 and a plurality of VOBs 10. The control data 11 is located at the head portion of the VTS 3. Identification numbers (IDs) are allocated to the respective VOBs 10. The part in which a plurality of VOBs 10 are continuously located is referred to as a VOB set (VOBS).

The control data 11 includes a PGCI (Program Chain Information). The PGCI is information related to a program chain prescribing logical divisions formed by connecting a plurality of cells 20. Each VOB 10 includes control information, picture information, and audio information.

Each VOB 10 is composed of a plurality of cells 20. Identification numbers (IDs) are allocated to the respective cells 20. Each VOB 10 is composed of only the complete cells 20. That is, there is no cell laid across the boundary of the neighboring VOBs 10.

Each cell 20 is composed of a plurality of VOB units 30 (VOBUs 30). Identification numbers (IDs) are allocated to the respective VOB units 30. The VOB unit 30 is a unit of picture information, audio information, and sub-picture information. In addition, the sub-picture information includes information representing a caption of a motion picture.

Each VOB unit 30 may include a navigation pack 41 (referred to as a "navi pack", hereinafter), one or a plurality of video packs 42, one or a plurality of audio pack 43, and one or a plurality of sub-picture packs 43. The video pack 42 includes only video data or picture data representing picture information. The audio pack 43 includes only audio data or sound data representing audio information. The sub-picture pack 44 includes only sub-picture data representing sub-picture information. In addition, the sub-picture data includes graphic data used for producing the characters, graphics and images. In addition, the DVD standards permits recording eight kinds of sounds on a DVD, and permits recording 32 kinds of sub-pictures on a DVD.

A reproduction time period of a signal VOB unit 30 is set within the range of 0.4 to one second. That is, a time period necessary for reproducing data included in the packs 41–43 located between a navi pack 41 and the next navi pack 41 is set within the range of 0.4 to one second. The reason why a reproduction time period of a single VOB unit 30 is set at 0.4 second or more than 0.4 second is to reduce the capacity of a PCI buffer installed in a reproducing apparatus. The reason why a reproduction time period of a single VOB unit 30 is set at one second or less than one second is because MPEG2 requires a limitation that allowable delay time period for a decoding process for a video pack 42 is one second. Accordingly, the navi pack 41 is always detected at intervals within the range of 0.4 to one second.

The navi pack 41 is always placed in each VOB unit 30 and always located at the head portion of each VOB unit 30. The number of navi pack 41 contained in one VOB unit 30 is always one. In contrast, each of the video pack 42, the audio pack 43 and the sub-picture pack 44 is not always placed in the VOB unit 30, and the number of them contained in one VOB unit 30 and order of them are not restricted.

Each of the video pack 42, the audio pack 43, and the sub-picture pack 44 shown in FIG. 2 corresponds to the pack P shown in FIG. 1B.

In principle, a pack P may include a plurality of packets PT, and video information, audio information and sub-picture information may be allocated to the respective packet PT contained in one pack P. However, in the DVD 1, one pack P includes only one packet PT.

Furthermore, all of the video packs 42 contained in a single VOB unit 30 composes one or a plurality of GOP (Group Of Picture). The GOP is a minimum image unit which can be independently reproduced, and standardized by MPEG2. The PTS is placed at the head portion of each GOP. The PTS indicates a reproduction time point on the reproduction time base at which video data contained in the GOP should be reproduced.

Referring to FIG. 3A, the navi pack 41 will be described in detail. The navi pack 41 includes a DSI packet 51 and a PCI packet 50. The DSI packet 51 is a packet PT including search information for the purpose of retrieving pictures, images or sounds intended for reproduction. For example, the DSI packet 51 includes information indicating addresses or other positional data to determine positions at which pictures, images and sounds are recorded on the DVD 1. The PCI packet 50 is a packet PT including information for the purpose of controlling reproduction and displaying of pictures, images and sounds retrieved by the search information included in the DSI packet 51. In addition, neither the PTS nor the DTS is included in the packet header 55 of the DSI packet 51. Similarly, neither the PTS nor the DTS is included in the packet header 55 of PCI packet 50.

The stream IDs of both the DSI packet 51 and the PCI packet 51 are set at 0xBF (according to private stream 2 standard). The sub-stream ID of the DSI packet 51 is set at 0x00. The sub-stream ID of the PCI packet 50 is set as 0x01. The sub-stream ID is placed after the packet header 55. By referring the sub-stream ID, it is possible to distinguish the DSI packet 51 and the PCI packet 50. In addition, the sub-stream ID is required by the DVD standard.

The PCI packet 50 includes high-light information. The highl-ight information is information prescribing conditions or motions of images or characters showing selection branches. The high-light information allows control of conditions or motions of images or characters displayed in a menu screen in response to a user's input. For example, when the user selects any one of the selection branches shown by the displayed menu screen, the condition or the position of the image or characters corresponding to the selected selection branch is changed, and the instruction corresponding to the selected selection branch is issued. Such operations are achieved by the high-light information. In addition, images of a frame, selection buttons and other items necessary for producing the menu screen are formed by the sub-picture data included in the sub-picture packs 44.

Referring to FIG. 3B, the video pack 42 will be described in detail. The video pack 42 includes video data 64 compressed by MPEG2 compression technique. The video data 64 only includes picture information relative to one program. If the packet PT contains the head portion of an I picture (Intra-coded picture, prescribed by MPEG2), both the PTS and DTS are described in the packet header 55 in this packet PT. Furthermore, the stream ID of the packet PT including video data 64 is set at 0xE0.

In addition, in FIG. 3B, the packet PT containing the video data 64 is only located after the pack header 57. However, dummy data or padding packet may be added after the packet PT to adjust a data rate. In this case, it is necessary that the total length of the pack header 57, the packet PT and the dummy data is 2048 bytes.

Furthermore, the video data 64 is placed in the PS so as to prevent that both lack of the video data 64 and excess of the video data 64 occur in a buffer for accumulating the video data 64.

Referring to FIG. 3C, the audio pack 43 will be described in detail. The audio pack 43 includes audio data 65 compressed by AC-3 compression technique. As stated above, eight kinds of audio information may be recorded on the DVD 1. If the head portion of the AAU exists within the packet PT, the PTS is described in the packet header 55 in this packet PT.

The stream ID of this packet PT is 0xBD (according to private stream 1 standard). The sub-stream ID is any one of 0x80 through 0x87. The stream number of the audio information is defined by the lowest three bits of the sub-stream ID.

The 4 bytes data including the sub-stream ID is referred to as a private data, and placed at the head portion of the audio data 65. The area in which this data is placed is referred to as a private data area. In addition to the sub-stream ID, information to be used for reproduction by using the AC-3 compression technique is contained in the private data area. These arrangement are prescribed by the DVD standard.

In addition, in FIG. 3C, the packet PT including the audio data 65 is only located after the pack header 57. However, like the video pack 42, dummy data or padding packet may be added after the packet PT to adjust a data rate. In this case, it is necessary that the total length of the pack header 57, the packet PT and the dummy data is 2048 bytes.

Furthermore, the video data 65 is placed in the PS so as to prevent that both lack of the audio data 65 and excess of the audio data 65 occur in a buffer for accumulating the audio data 65.

Figure 4A:
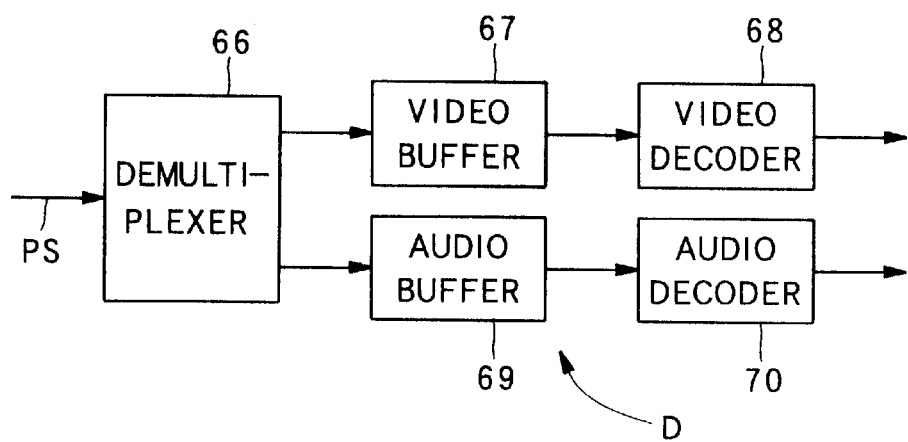
FIG. 4A is a block diagram showing a decoder for a program stream in an embodiment of the present invention.

Referring to FIG. 4A, a decoder for decoding the PS will be described. In FIG. 4A, a decoder D includes: a demultiplexer 66 for extracting the video packs 42 and the audio packs 43 from the PS and separately supplying the video packs 42 and the audio packs 43 to the video buffer 67 and the audio buffer 69, respectively; a video buffer 67 for temporarily accumulating data contained in the video packs 42; a video decoder 68 for decoding video data contained in the video packs 42, an audio buffer 69 for temporarily accumulating data contained in the audio packs 43; and an audio decoder 70 for decoding the audio data contained in the audio packs 43.

When the PS is supplied to the demultiplexer 66, the data rate of the PS is 10.08 Mbps. The capacity of the video buffer 67 is 237568 bytes, which is the sum of 8192 bytes of an additional capacity and 229376 bytes of a capacity prescribed by MPEG2-MP@ML (Main Profile at Main Level). The capacity of the audio buffer 69 is 4096 bytes.

Each of the PTS and DTS contained in the video pack 42 is set so as to prevent that both lack of the video data and excess of the video data occur in the video buffer 37. The PTS contained in the audio pack 43 is set so as to prevent that both lack of the audio data and excess of the audio data occur in the audio buffer 69.

Figure 4B:
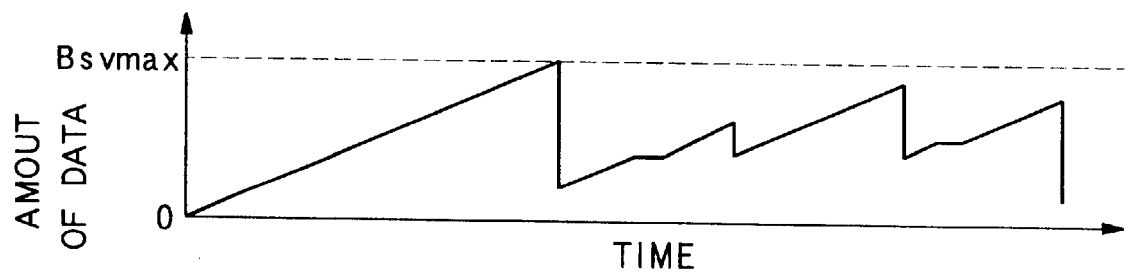
FIG. 4B is a diagram showing changes of the amount of data accumulated in a buffer in the embodiment of the present invention.

FIG. 4B shows an example of changes of the amount of data accumulated in the video buffer 67. In FIG. 4B, "Bsvmax" indicates the maximum amount of data which can be accumulate in the video buffer 67. Bsvmax is 237568 bytes.

As shown in FIG. 4B, the amount of data accumulated in the video buffer 67 is increased at a constant increasing rate. This means that the data is input into the video buffer 67 at a constant data rate. This input data rate is equal to that of the demultiplexer 66, namely 10.08 Mbps. In addition, in FIG. 4B, sometimes the increase of the amount of data accumulated in the video buffer 67 is temporarily suspended. This means that supplying of the data contained in the video pack 42 is temporarily suspended while data contained in the audio pack 43 is being supplied to the audio buffer 69. Moreover, in FIG. 4B, the amount of the data accumulated in the video buffer 67 is sharply decreased after the data is sufficiently increased. This means that the data (video data 64) is instantaneously output from the video buffer 67 to the video decoder 68. The output of the video data 64 is done for each picture.

Figure 5A:
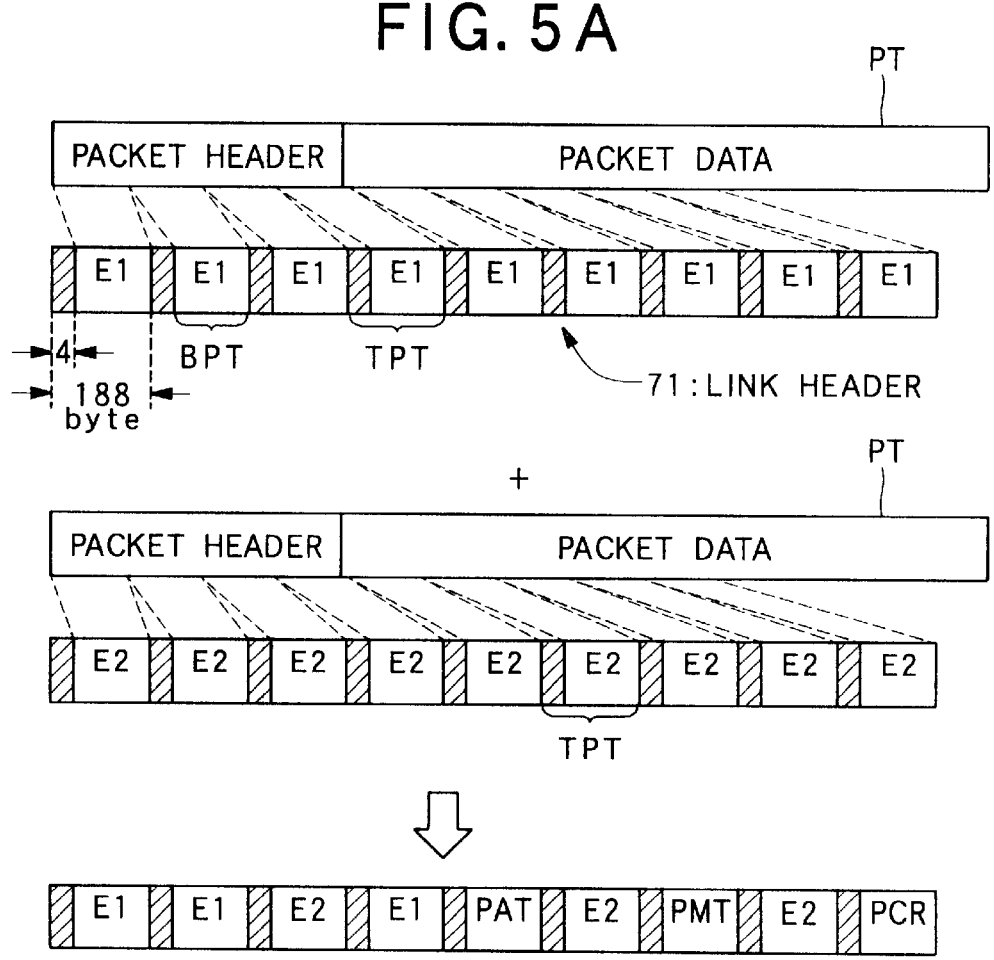
FIG. 5A is a diagram showing a structure of a transport stream.

Referring next to FIG. 5A, the TS which is a kind of standard data stream in MPEG2 will be described. As shown in FIG. 5A, the TS is produced by dividing the packet PT into a plurality of smaller packets BPT and inserting a link header 71 between the neighboring packets BPT. Each packet BPT is 184 bytes in length. The link header 71 is 4 bytes in length. The packet formed by connecting a packet BPT and a link header 71 is referred to as a "TS packet TPT". The TS packet TPT whose length is 188 bytes is a unit of the TS. Accordingly, the TS is formed by multiplexing various kinds of TS packets TPT, such as TS packets TPT including video data, TS packets TPT including audio data, etc.

Each link header 71 includes 13 bytes of a PID (Packet ID). The PID is information for the purpose of identifying the individual stream corresponding to each TS packet TPT.

Further, a plurality of particular tables, such as PATs (Program Association Tables), and PMTs (Program Map Tables), may be packetized as TS packets TST, and added to the TS.

In addition, the PS serves as a data stream to send only one program, while the TS serves as a data stream to send a plurality of programs. In addition, the program is a unit including video data and audio data.

The PAT includes the PIDs of the PMTs corresponding to a certain program. The PID of the PAT is 0x00. The PMT includes the PIDs of pictures, sounds, and additional data contained in the certain program. If the total length of these tables is less than 184 bytes, one or a plurality of data representing 0xFF are added after these tables so as to set the total length of these tables and data at 184 byte.

An adaptation field may be formed in the TS packet TPT. In the adaptation field, a PCR (Program Clock Reference) is described. The PCR is similar to the SCR in the PS. The PCR represents a time at which the TS packet TPT including this PCR arrives in a buffer installed in a decoder, and it is produced on the basis of a clock with a frequency of 90 kHz and 27 MHz.

Data contained in the packet PT may be placed after the adaptation field in the TS packet TPT. The area in which such data is placed is referred to as a "pay load". That is, as to the TS packet, the pay load is an area except for the link header 71 and the adaptation field, within the TS packet, and it is a place in which data contained in the packet PT actually recorded. If the total length of the data to be contained in the TS packet TPT is less than 184 bytes, the total length of this data is adjusted by using dummy data included in the adaptation data.

The DVD standard or MPEG2 requires that the PCR is inserted into the TS at 0.1 second or less than 0.1 second intervals.

Moreover, for at least the purpose of adjusting the data rate of the TS, one or a plurality of NULL packets may be inserted into the TS. Since the NULL packet serves as a packet only for adjusting the data rate of the TS, no significant data is recorded in the pay load in this packet. For example, stuffing data, which means insignificant data, is recorded in the pay load in the NULL packet.

Next, a system standard of a television designed to reproduce and display audio and visual information provided by the TS will be described. This system standard is mainly prescribed in accordance with the standard of the TS. In addition to this, the following limitations are prescribed as this system standard.

(i) The PMT must be inserted at 0.4 second or less than 0.4 second intervals.

(ii) The PAT must be inserted at 0.1 second or less than 0.1 second intervals.

(iii) The head portion of a video access unit (a picture start code, a group start code, or a sequence header) must be placed at the head portion of the pay load of a packet PT. In addition, as to a packet PT, the pay load is an area in which packet data is recorded.

(iv) If the audio data compressed by AC-3 compression technique is used, the stream ID is 0xBD (according to private stream 1).

(v) The multiplex rate is approximately 19.39 Mbps.

Figure 5B:
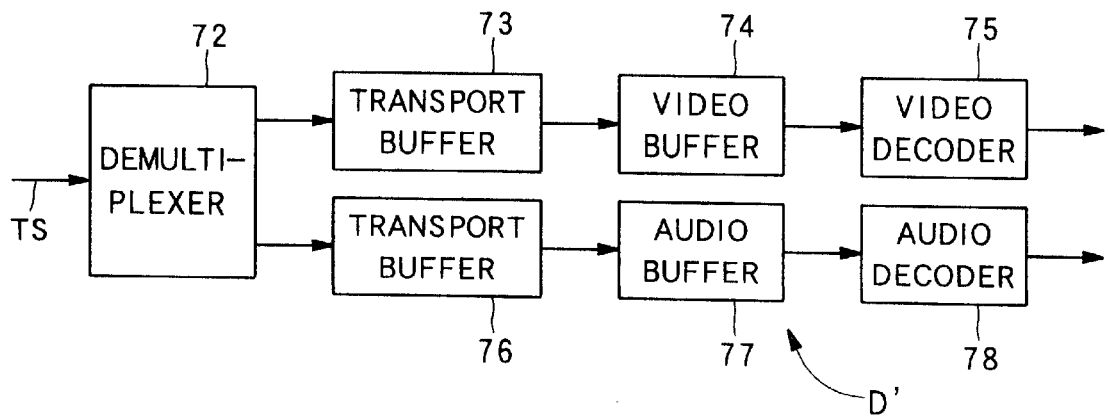
FIG. 5B is a block diagram showing a decoder for a transport stream in the embodiment of the present invention.

FIG. 5B shows a decoder for decoding the TS. In FIG. 5B, a decoder D' includes: a demultiplexer 72 for extracting the video data and the audio data from the TS and for separately supplying the video data and the audio data to the transport buffer 73 and 76, respectively; a couple of transport buffers 73 and 76 for compensating bias of data caused by the link header 71 and the like; a video buffer 74 for temporarily accumulating the video data; a video decoder 75 for decoding the video data; an audio buffer 77 for temporarily accumulating the audio data; and an audio decoder 78 for decoding the audio data.

The capacity of the video buffer 74 is 239376 bytes, which is the sum of 10000 bytes of an additional capacity and 229376 bytes of a capacity prescribed by MPEG2-MP@ML.

The capacity of the audio buffer 77 is 3584 bytes in principle. However, this capacity is not particularly standardized as the standard of the television.

In the TS, the PTS and DTS are set so as to prevent that both lack of data and excess of data occur in the video buffer 74 and the. audio buffer 77.

Furthermore, the capacity of each of the transport buffer 73 and 76 is 512 bytes. This is prescribed by the DVD standard or MPEG2.

II. Information Reproducing Apparatus

Referring to FIGS. 6 through 18, an information reproducing apparatus of an embodiment of the present invention will be described. The information reproducing apparatus is an apparatus for converting the PS reproduced from the DVD 1 into the TS and outputting this TS to a television designed to reproduce and display audio and visual information provided by the TS.

Figure 6:
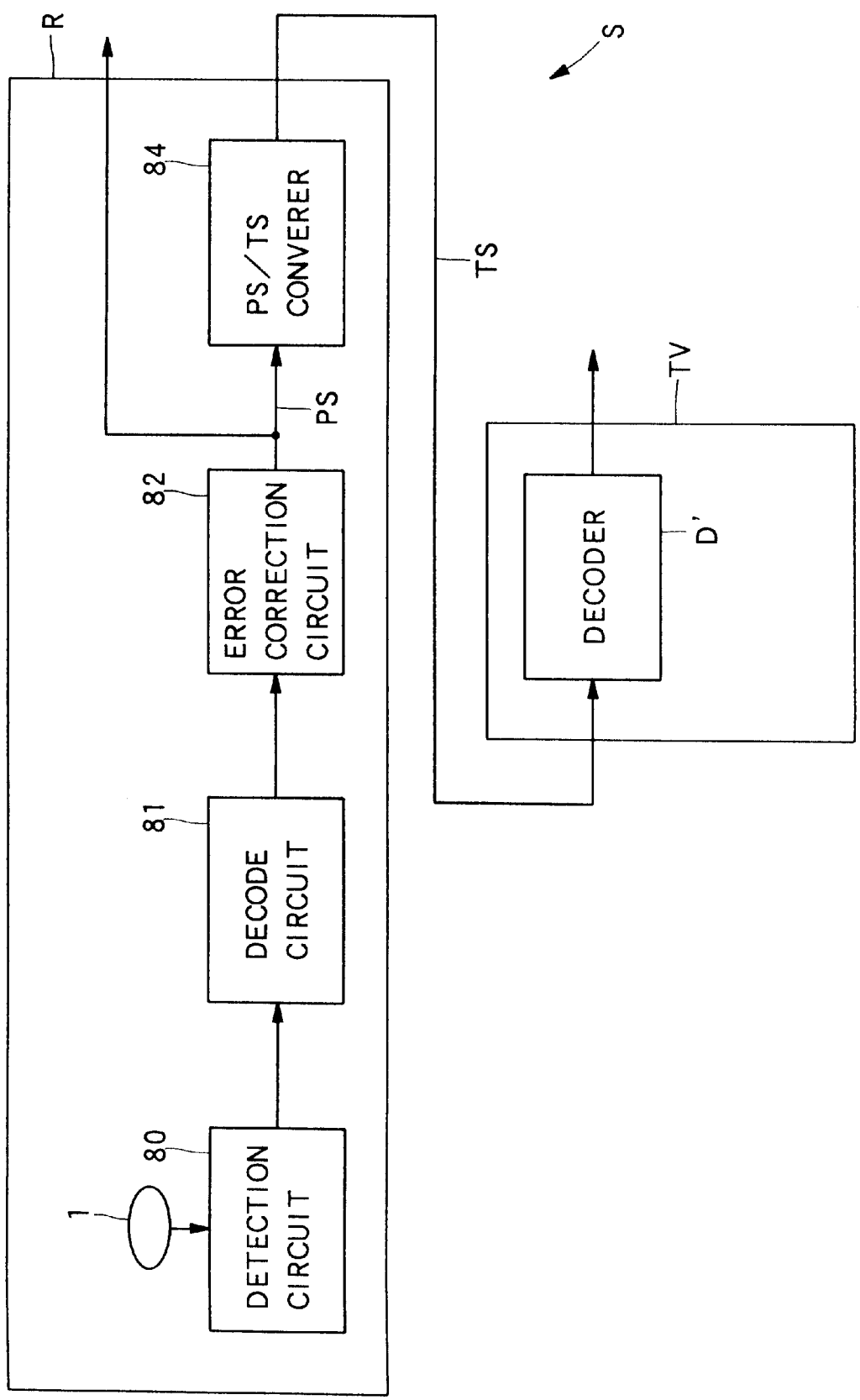
FIG. 6 is a block diagram showing a configuration of an information reproducing apparatus of the embodiment of the present invention.

FIG. 6 shows the configuration of an information reproducing apparatus of the embodiment of the present invention. In FIG. 6, the information reproducing apparatus S has: a reproducing apparatus R for converting the PS reproduced from the DVD 1 into the TS and outputting this TS to a television decoder TV and another external apparatus; and the television decoder TV for decoding the TS and outputting audio and visual information obtained from the TS to an external output devices such as an external monitor and external speakers.

The reproducing apparatus R includes: a detection circuit 80 for radiating a light beam to the DVD 1 and detecting information pits formed on the DVD 1 on the basis of the light beam reflected by the DVD 1; a decode circuit 81 for decoding a signal corresponding to the detected information pits; an error correction circuit 82 for carrying out an error correcting process on the decoded signal and outputting the PS; and a PS/TS converter for converting the PS into the TS.

The television decoder includes the decoder D' for decoding the TS reproduced by the reproducing apparatus R and outputting audio and visual information obtained from the TS to the external output devices. The television decoder adopts the aforementioned system standard.

Figure 7:
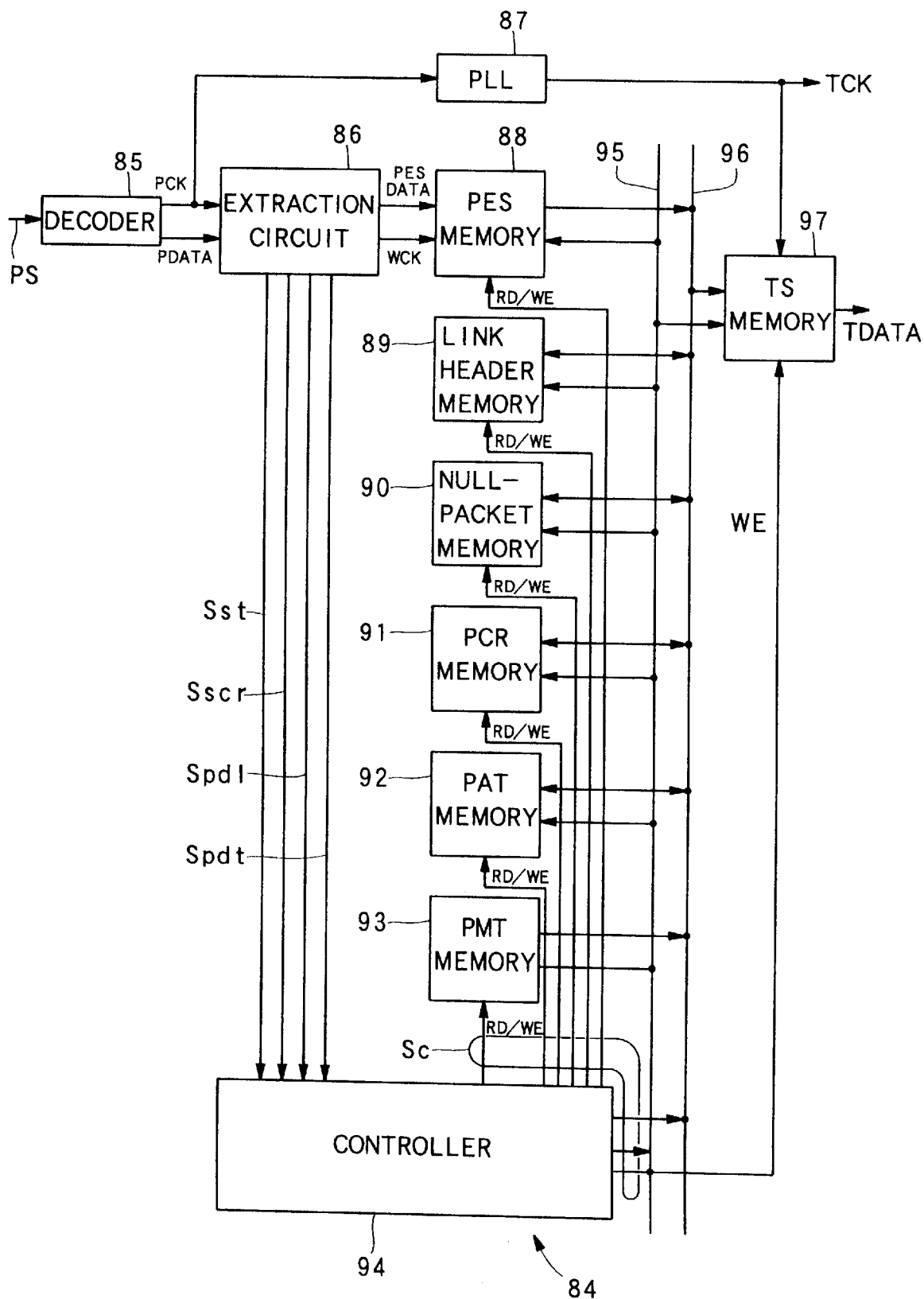
FIG. 7 is a block diagram showing a configuration of a PS/TS converter of the embodiment of the present invention.

FIG. 7 shows the configuration of the PS/TS converter 84. In FIG. 7, the PS/TS converter 84 includes a decoder 85, extraction circuit 86, PLL (Phase Locked Loop) 87, a PES memory 88, a link header memory 89, a NULL packet memory 90, a PCR memory 91, a PAT memory 92, a PMT memory 93, a controller 94, an address bus 95, a data bus 96, and a TS memory 97.

The decoder 85 decodes the supplied PS, and then generates a PS clock PCK, and then outputs this to the extraction circuit 86 and the PLL 87. Further, the decoder 85 generates data PDATA corresponding to data contained in the PS, and then outputs this to the extraction circuit 86.

The extraction circuit 86 extracts unnecessary data from the data PDATA, and outputs signals corresponding extracted unnecessary data to the controller 94. Further, the extraction circuit 86 converts the PS clock into an internal clock WCK, and outputs this to the PES memory 88.

Each of the PES memory 88, the link header memory 89, the NULL packet memory 90, the PCR memory 91, the PAT memory 92, and the PMT memory 93 temporarily stores data according to address information supplied from the controller 94 via the address bus 95, and outputs the stored data to the data bus 96 under control of the controller 94. The data bus 96 serves as not only an output data bus but also an input data bus under control of the controller 94. The controller 94 controls reading operations and writing operations of the memories 88 through 93 by using the control signals Sc. The transmissions of data from the memories 88–93 to the TS memory 97 is done by using DMA (Direct Memory Access) technique.

The TS memory 97 temporarily stores the TS and outputs data TDATA corresponding to the TS.

The PLL 87 converts the PS clock OCK into a TS clock TCK to be used for the TS, and outputs this to the television decoder TV and the TS memory 97.

Figure 8:
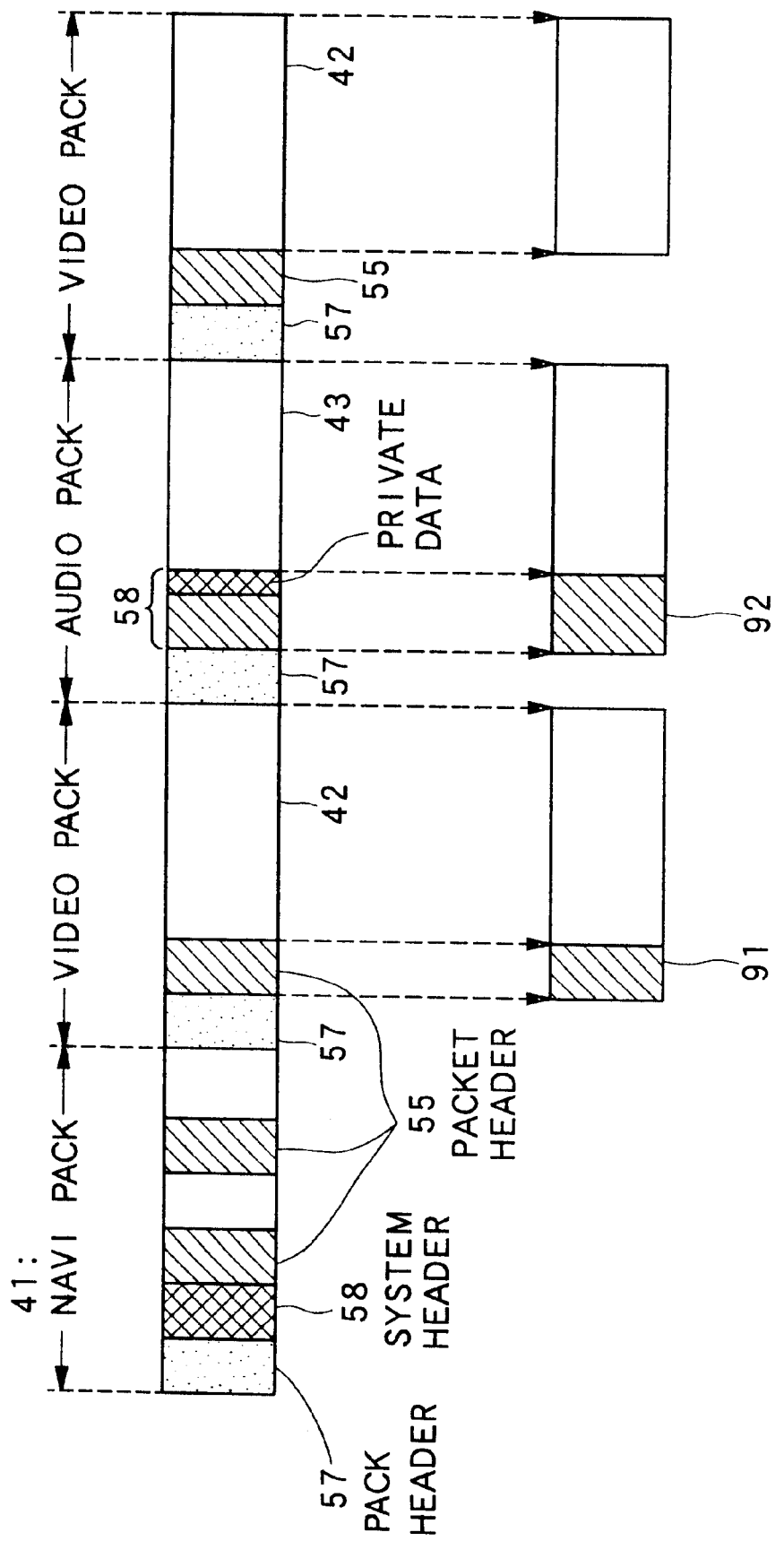
FIG. 8 is a diagram for showing an operation of the PS/TS converter.

FIG. 8 shows extraction of data from the PS. As shown in FIG. 8, the extraction circuit 86 firstly disregards or discards the pack header 57 and the system header 58, and extracts only the packet PT form the PS.

According to the aforementioned system standard of the television, the head portion of a video access unit must be placed at the head portion of the pay load of a packet PT. This means that the head portion of a picture is always located at the head portion of the pay load of the packet PT including video information 64. In the PS obtained from the DVD 1, it is ensured that the head portion of a picture is located at the head portion of the VOB unit 30. That is, at least at the head portion of the VOB unit 30, the head portion of a picture is always located. Therefore, as to the packet PT located at the head portion of the VOB unit 30, both the packet header 55 and the video data 64 are extracted by the extraction circuit 86. As to the other packets PT, the packet header 55 is discarded or disregarded, and only the video data 64 is extracted by the extraction circuit 86. Accordingly, the whole of the VOB unit 30 is provisionally converted into one large packet.

Next, the data which represents the length of the packet and which is contained in the extracted packet header is rewritten so as to set this data at zero. This means that the length of the packet is not defined. In addition, neither the PTS nor the DTS contained in the extracted packet header is rewritten.

Further, the unnecessary packets PT including data other than the video data 64 and audio data 65 is discarded or disregarded. If more than one audio stream is included in the PS, the unnecessary audio stream is discarded or disregarded. The discrimination between a necessary audio stream and an unnecessary audio stream is performed by a selection circuit, which is not illustrated.

Further, in the PS obtained from the DVD 1, there is a private data area at the head portion of the packet PT (after the packet header 55) in the audio pack 43 including the audio data 65 compressed by AC-3 compression technique. In this area, the 4 bytes data including the aforementioned sub-stream ID is described. Since such data is unnecessary for the television decoder TV, this is discarded or disregarded.

Figure 9:
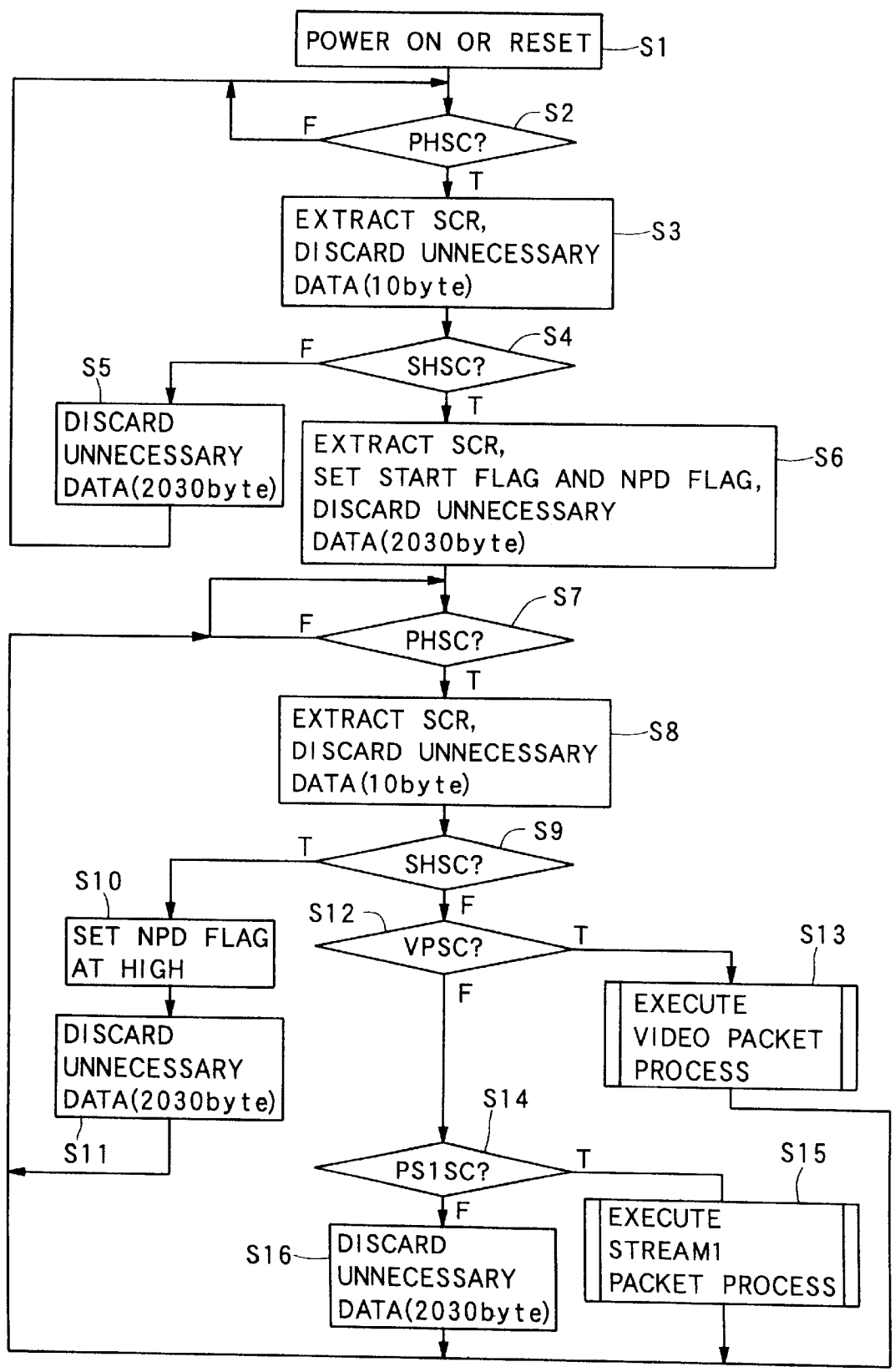
FIG. 9 is a flowchart showing an operation of an extraction circuit of the embodiment of the present invention.
Figure 10:
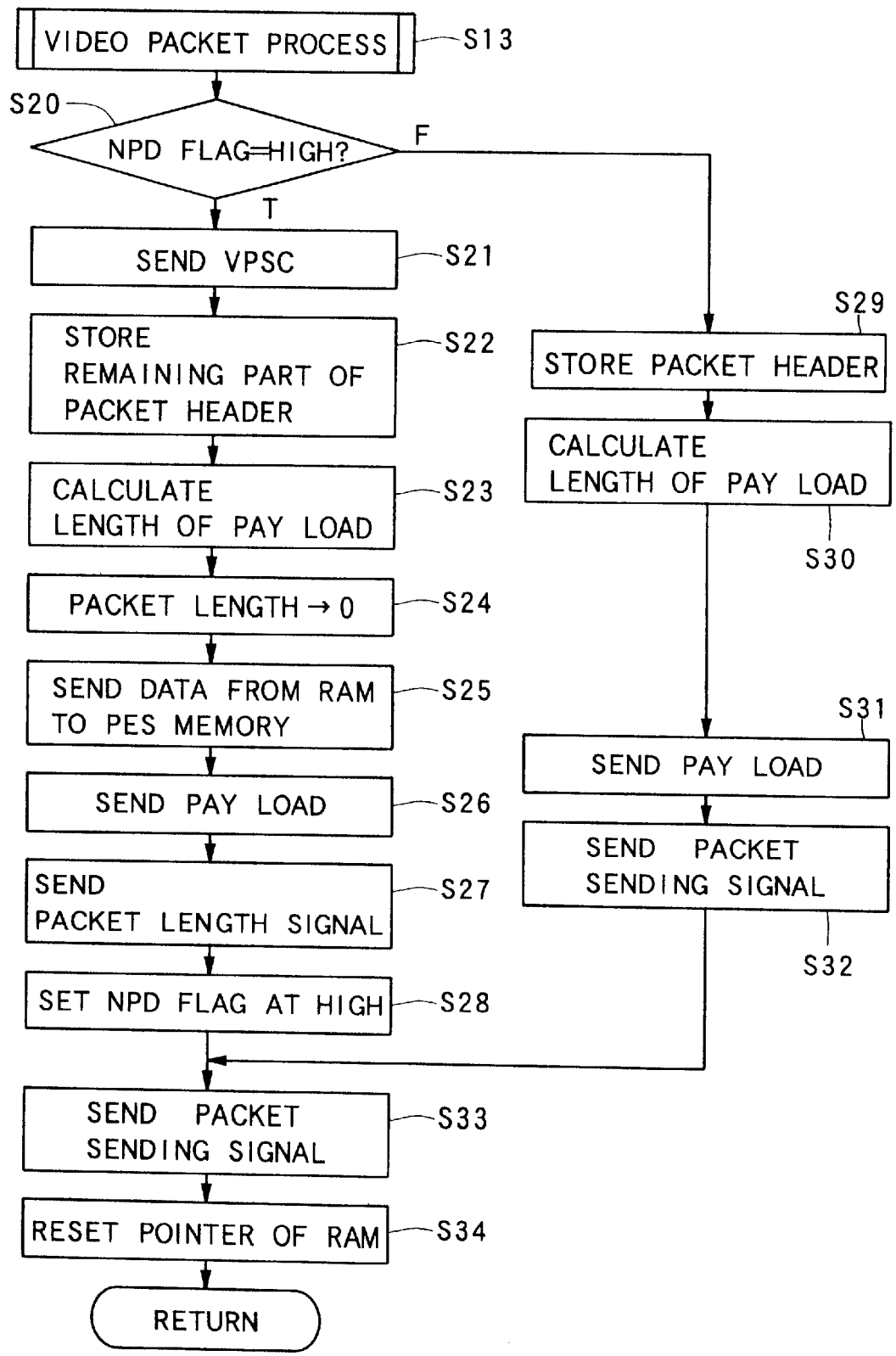
FIG. 10 is a flowchart showing a video packet process of the embodiment of the present invention.
Figure 11:
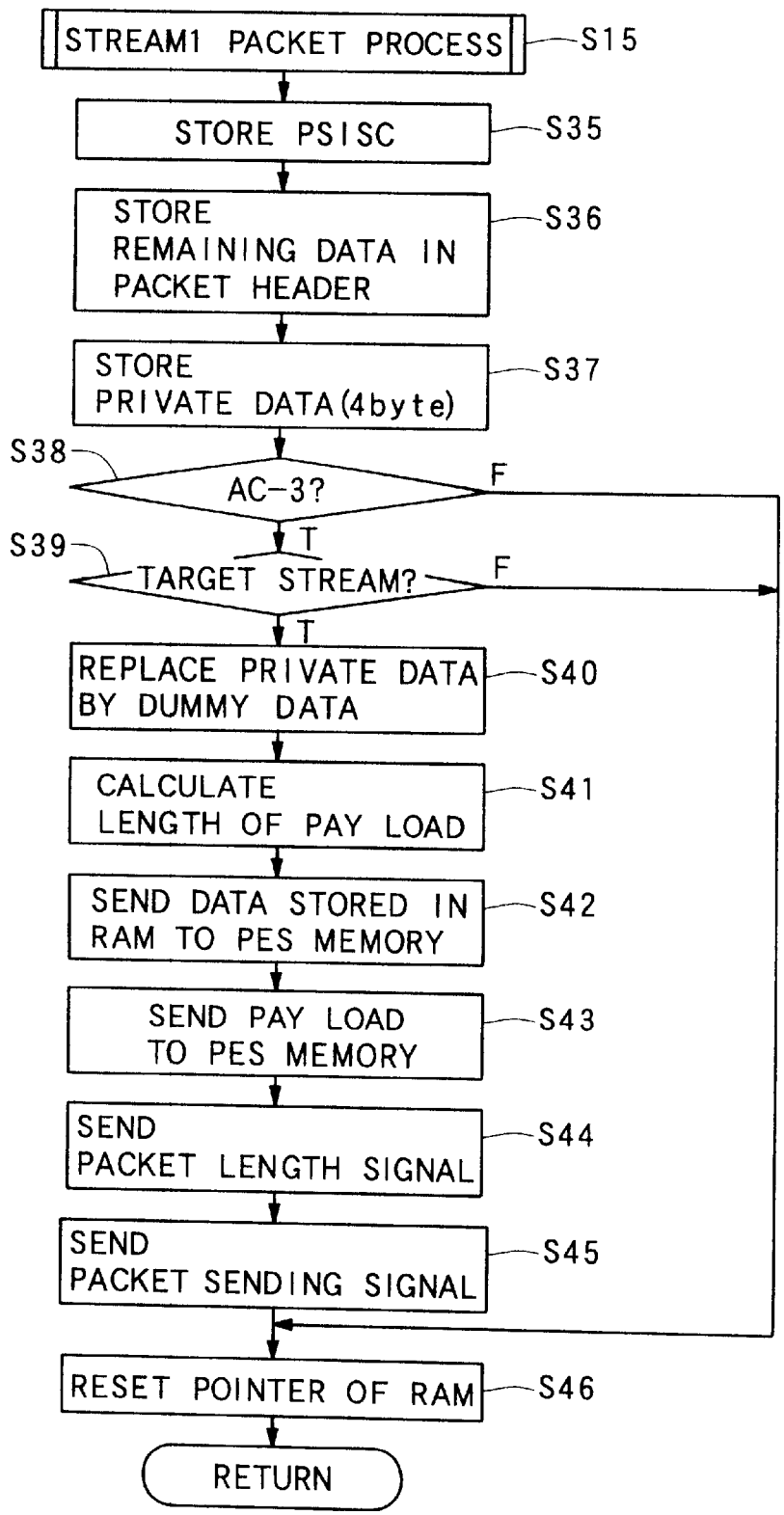
FIG. 11 is a flowchart showing a stream 1-packet process of the embodiment of the present invention.

Referring to FIGS. 9 through 11, an operation of the extraction circuit 86 will be described in detail.

When the extraction circuit 86 is enabled or reset (step S1), the extraction circuit 86 determines whether or not a pack header start code (PHSC) is detected, in order to recognize an input of the pack header 57 (step S2). The PHCS is located at the head portion of the pack header 57. If the PHCS is not detected, the extraction circuit 86 executes step S2 repeatedly until the PHSC is detected. If the PHSC is detected, the extraction circuit 86 extracts the SCR base portion and the SCR expanding portion from the pack header 57, and rearranges these portions in regular order. Next, the extraction circuit 86 generates an SCR signal Sscr representing extracted SCR, and then outputs this to the controller 94. Next, the extraction circuit 86 discards the PHSC and the remaining data (10 bytes) contained in the pack header 57 (step S3).

The extraction circuit 86 next determines whether or not a system header start code (SHSC) is detected, in order to recognize an input of the system header 58 (step S4). The SHSC is 0x000001BB, and is located at the head portion of the system header 58. If a different code is detected, the extraction circuit 86 discards 2030 byte of data including this detected code (step S5), and next executes step S2 again. The extraction circuit 86 can find the pack containing the system header 58 by repeatedly executing steps S2 through S5.

If the SHSC is detected, the extraction circuit 86 outputs a start signal Sst indicating that the SHSC is detected, to the controller 94. Further, the extraction circuit 86 outputs the SCR of the system header 58 to the controller 94 as the SCR signal Sscr. In response to this, the controller 94 sets a start flag at the HIGH state.

The controller 94 next sets a navi pack detection (NPD) flag at the HIGH state. Next, the extraction circuit 86 discards 2030 bytes of data (step S6).

The extraction circuit 86 next determines whether or not the PHSC contained in the pack header 57 of the next pack is detected (step S7). If the PHSC is detected, the extraction circuit 86 outputs the SCR of this pack header 57 as the SCR signal Sscr to the controller 94, and then discards the remaining data (10 bytes).

The extraction circuit 86 next determines whether or not the SHSC is detected (step S9). If the SHSC is detected at this stage, the extraction circuit 86 recognizes that the navi pack 41 is detected. In response to this, the controller 94 sets the NPD flag at the HIGH state (step S10). Then, the extraction circuit 86 discards 2030 byte of data in the navi pack 41, and next executes step S7, again.

On the other hand, if the SHSC is not detected at step S9, the extraction circuit 86 next determines whether or not a VPSC is detected, in order to recognize the packet PT including video data 64, namely the packet PT contained in the video pack 42 (step S12). The VPSC is contained in the packet PT including video data 64. If the VPSC is detected, the extraction circuit 86 executes a video packet process shown in FIG. 10. According to the video packet process, the packet PT including video data 64 is sent to the PES memory 88 (step S13). Thereafter, the extraction circuit 86 executes step S7 again.

If the VPSC is not detected, the extraction circuit 86 next determines whether or not a private stream 1 start code (PS1SC) is detected, in order to recognize the packet PT including audio data 65, namely the packet PT contained in the audio pack 43 (step S14). If the PS1SC is detected, the extraction circuit 86 executes a stream 1 packet process shown in FIG. 11. According to the stream 1 packet process, the packet PT is sent to the PES memory 88 if the packet PT includes the audio data 43.

If the PS1SC is not detected, the extraction circuit 86 discards 2030 byte of data in the pack (step S16), and next executes step S7 again.

Referring next to FIG. 10, the video packet process executed at step S13 in FIG. 9 will be described.

Firstly, the extraction circuit 86 determines whether or not the state of the NPD flag is the HIGH state (step S20). If so, the extraction circuit 86 recognizes that the video pack 42 located at the head portion of the VOB unit 30 is detected. As stated above, as to the video pack 42 located at the head portion of the VOB unit 30, it is needed to send both the packet header 55 and the video data 64 (pay load) to the PES memory 88.

The extraction circuit 86 next sends the VPSC to the PES memory 88 (step S21), and stores the remaining data contained in the packet header 55 into an internal RAM (not illustrated) installed in the extraction circuit 86 (step S22). The length of that remaining data is calculated on the basis of a header length information contained in the packet header 55.

The extraction circuit 86 next calculates the length of the pay load containing the video data 64 on the basis of the following equation (step S23).

$$Lp = VpI - 3 - VhI$$

where "Lp" denotes the length of the pay load, "VpI" denotes the value of the PES packet length information, and "VhI" denotes the value of the header length information. The value Lp representing the length of the pay load is stored in an internal register installed in the extraction circuit 86.

The extraction circuit 86 rewrites the value of the packet length information in the packet header 55 stored in the internal RAM in the extraction circuit 86 so as to set this value at zero (step S24), and sends the packet header 55 from the internal RAM to the PES memory 88 (step S25).

The extraction circuit 86 next sends the video data 64 contained in the pay load to the PES memory 88 (step S26). At this time, the extraction circuit 86 recognizes the amount of the video data 64 on the basis of the length of the pay load calculated at step S23.

The extraction circuit 86 sends a packet length signal Spdl representing the amount (the number of bytes) of the video data 64 which has been sent to the PES memory 88 at step S26, to the controller 94 (step S27). The number of bytes of the video data 64 may be counted by using a counter (not illustrated). Alternatively to this, the number of bytes of the video data 64 may be calculated on the basis of the packet length information.

In response to this, the controller 94 sets the NPD flag at the LOW state (step S28). Next, the extraction circuit 86 sends a packet sending signal Spdt with HIGH level to the controller 94 in order to inform that the video packet process is finished (step S33), and reset the pointer of the internal RAM (step S34). Accordingly, the video packet process is finished.

At step S20, on the other hand, if the state of the NPD flag is the LOW state, the extraction circuit 86 recognizes that the video pack 42 located at a portion except for the head portion in the VOB unit 30 is detected. In this case, it is needed to send only the pay load to the PES memory 88.

Therefore, the extraction circuit 86 firstly stores the packet header 55 of this packet PT into the internal RAM in the extraction circuit 86 (step S29), and then calculates the length of the pay load by using data contained in this packet header 55, and then stores the calculated value representing the length of the pay load into the internal register of the extraction circuit 86 (step S30).

The extraction circuit 86 secondly sends the video data 64 contained in the pay load to the PES memory 88 (step S31). The extraction circuit 86 next sends the packet length signal Spdl representing the amount of the video data 64 which has been sent to the PES memory 88 at step S31, to the controller 94 (step S32), and next executes steps S33 and S34.

Referring next to FIG. 11, the stream 1 packet process executed at step S15 in FIG. 9 will be described.

Firstly, the extraction circuit 86 extracts the PS1SC and the remaining data from the packet header 55, and further extracts 4 bytes of data located after the packet header 55. Next, the extraction circuit 86 sends the extracted PS1SC, the remaining data in the packet header 55, and 4 bytes data to the internal RAM (steps S35, S36 and S37).

The extraction circuit 86 next checks the contents of the substream ID contained in the private data described in the private data area, and determines whether or not the data contained in this packet PT is the audio data 65 compressed by AC-3 compression technique (step S38). If the contained data is not audio data 65 compressed by AC-3 compression technique, the extraction circuit 86 resets the pointer of the internal RAM (step S46), and then the process returns to the main process shown in FIG. 9.

If the contained data is audio data 65 compressed by AC-3 compression technique, the extraction circuit 86 next determines whether or not the audio data 65 belongs to the necessary audio stream (step S39).

If the audio data 65 does not belong to the necessary audio stream, the extraction circuit 86 resets the pointer of the internal RAM (step S46), and then, the process returns to the main process shown in FIG. 9.

If the data contained in this packet PT is the audio data 65 compressed by AC-3 compression technique, and if this audio data 65 belongs to the necessary audio stream, the extraction circuit 86 replaces the private data with dummy data with the same length (4 bytes), and then adds "4" to the value of the header length information contained in the packet header 55 stored in the internal RAM (step S40).

The extraction circuit 86 calculates the length of the pay load on the basis of the packet length information contained in the packet. header 55 stored in the internal RAM. At this time, the extraction circuit 86 subtracts 4 bytes from the value of the packet length information, because the private data (4 byte) was extracted from the pay load at step S37. Next, the extraction circuit 86 stores the calculated value representing the length of the pay load into the internal register (step S41).

The extraction circuit next sends both the data stored in the internal RAM and the audio data 65 contained in the pay load to the PES memory 88 (steps S42 and S43). Further, the extraction circuit calculates the amount (the number of bytes) of the data which has been now sent to the PES memory 88, and sends the calculated value to the controller 94 as the packet length signal Spdl (step S44).

The extraction circuit 86 next sends the packet sending signal Spdt with HIGH level to the controller 94 in order to inform the controller 94 that the stream 1 packet process is finished. (step S45), and then resets the pointer of the internal RAM (step S46). Then, the process returns to the main process shown in FIG. 9.

The PES memory 88 serves as a FIFO (First In First Out). Since the PES memory 88 is operated for each pack, the capacity of the PES memory 88 is about 4 bytes.

In the TS, the bits composing data contained in each of the link header 71, the NULL packet, the PCR packet, the PAT, and the PMT are mostly predetermined and fixed. Therefore, typical data to be placed into each TS packet TPT are stored in advance into the link header memory 89, the NULL packet memory 90, the PCR memory 91, the PAT memory 92 and the PMT memory 93, respectively, and the typical data stored in each memories 89–93 is partly changed under control of the controller 94, when the PS/TS converting operation is performed. The data bus 96 is used to supply data to the memories 89–93, when the typical data is changed.

Referring to FIGS. 12 through 17, the typical data to be placed into each TS packet TPT will be described.

FIG. 12 shows an example of a structure of typical data to be placed into the TS packet TPT including the link header 71. This typical data is stored in the link header memory 89.

In addition, the number of bytes from the link header memory 89 is related to the amount of the dummy data. If the number of bytes of the pay load is 184 bytes and if there is no dummy data, four bytes of data located at the head portion of the structure of the typical data shown in FIG. 12 are only read out. In this case, the adaptation field control is set at "01". If the number of bytes of the pay load is 183 bytes and if one byte of dummy data is needed, five bytes of data located at the head portion of the structure of the typical data shown in FIG. 12 are read out. In this case, the adaptation field control is set at "11", and the adaptation field length is set at "0x00". If the number of bytes of the pay load is 182 bytes and if two bytes of dummy data are needed, six bytes of data located at the head portion of the structure of the typical data shown in FIG. 12 are read out. In this case, the adaptation field control is "11", and the adaptation field length is "0x01". If the number of bytes of the pay load is 181 bytes or less than 181 bytes, the data is read out by the amount corresponding to the value obtained by subtracting the number of bytes of the pay load from 188. In this case, the adaptation field control is set at "11", and the adaptation field length is set at the value obtained by subtracting the number of bytes of the pay load from 183.

The value of PID is set depending on the type of elementary stream.

According to the aforementioned system standard of the television, data obtained by shifting the program number in the left direction by 4 bits is used as Basic PID. "Basic PID+0x0001" indicates video information. "Basic PID+0x0004" indicates audio information. The PID is produced by using the program number selected by the selection circuit which is not illustrated.

The random access indicator is set at "1" as to the video packet located at the head portion of GOP.

FIG. 13 shows an example of a structure of typical data to be placed into the TS packet TPT including the NULL packet . This typical data is stored in the NULL packet memory 90. In FIG. 13, the PID of the NULL packet is set at "0x1FFF". In addition, the "data byte" is not specified.

FIG. 14 shows an example of a structure of typical data to be placed into the TS packet TPT including the PCR packet. This typical data is stored in the PCR memory 91. The PID of the PCR packet is set at "Basic PID+0x0001". The value of the PCR is calculated on the basis of the SCR, and rewritten, immediately before sending this packet. As the purpose of this packet is only to send the PCR, this packet has no pay load. Furthermore, as to the first PCR packet, the discontinuity indicator is set at "1".

FIG. 15 shows an example of a structure of typical data to be placed into the TS packet TPT including the PAT. This typical data is stored in the PAT memory 92. In FIG. 15, the PID of the PAT is set at "0x0000".

FIGS. 16 and 17 show an example of a structure of typical data to be placed into the TS packet TPT including the PMT. The typical data is stored in the PMT memory 93. The PID of the PMT is set at "Basic PID+0x0000". In addition, the descriptor with respect to program information is a program identifier and a program-smoothing-buffer-descriptor. The descriptor with respect to elementary stream information of video is a data-stream-assignment-descriptor. The descriptor with respect to elementary stream information of audio is an audio-elementary-stream-identifier and an AC-3 audio-descriptor.

Referring to FIGS. 18A through 19B, the principle of the PS/TS conversion of the embodiment of the present invention will be described.

In converting the PS into the TS on the embodiment of the present invention, the value of the PTS and the value of the DTS are not changed, and the SCR is converted into the PCR in such a way that the value of the SCR is equal to that of PCR. In case of necessity, the PCR may be exceptionally changed.

In general, if the PS is converted into the TS, the transfer rate of the TS becomes higher than that of the PS, because at least the link header 71 is added for each 184 bytes of data. The minimum transfer rate Rm of the TS is given as:

$$Rm = Rps \times (188/184) + Rt - Rph$$

where "Rps" denotes the transfer rate of the PS, "Rt" denotes the transfer rate of the PAT and PMT, and "Rph" denotes the transfer rate of the pack header 57.

According to the principle of the PS/TS conversion of the embodiment of the present invention, the PS can be effectively converted into the TS, if the transfer rate of the TS is higher than the minimum transfer rate Rm.

Figure 18A:
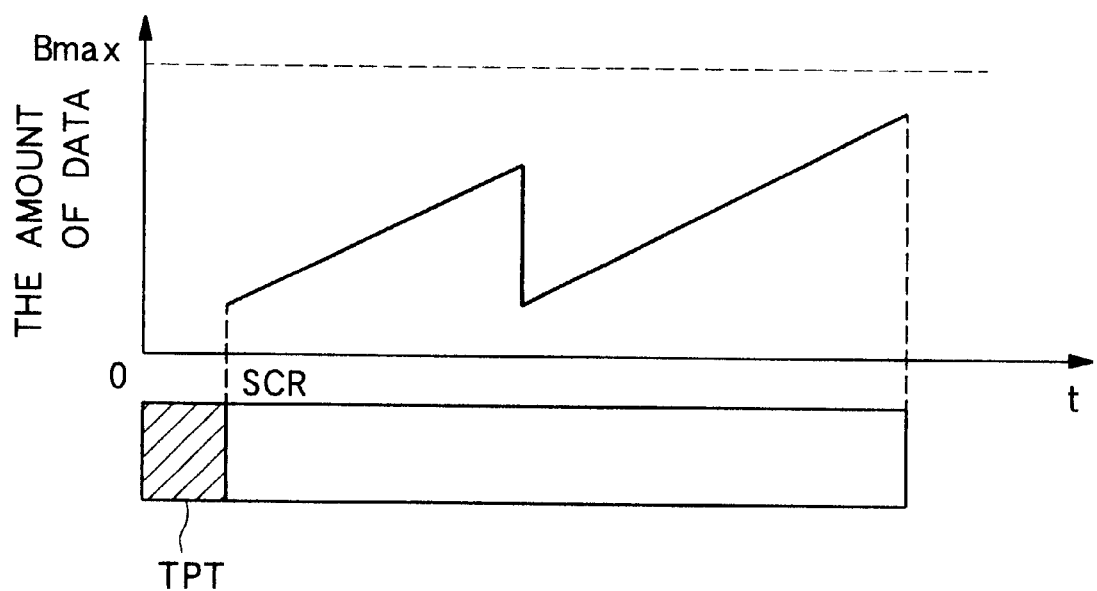
FIG. 18A is a diagram showing changes of the amount of data accumulated in a video buffer of the embodiment of the present invention.

FIG. 18A shows changes of the amount of video data 64 accumulated in the video buffer 67 of the decoder D with respect to one video pack 42. In FIG. 18A, the data is increased at a constant rate, and thereafter, it is sharply decreased, and then, it is increased again. Sharply decreasing of the data means that the data instantaneously output from the video data 64.

As stated above, the value of the PTS and the value of the DTS are not changed, and the SCR is basically converted into the PCR in such a way that the value of the SCR is equal to that of PCR. Therefore, there is a possibility that lack of data occurs in the buffers for TS (i.e., the transport buffers 73 and the video buffer 74), if the amount of data accumulated in the buffers for TS becomes smaller than that in the buffers for PS (i.e., the video buffer 67).

Figure 18B:
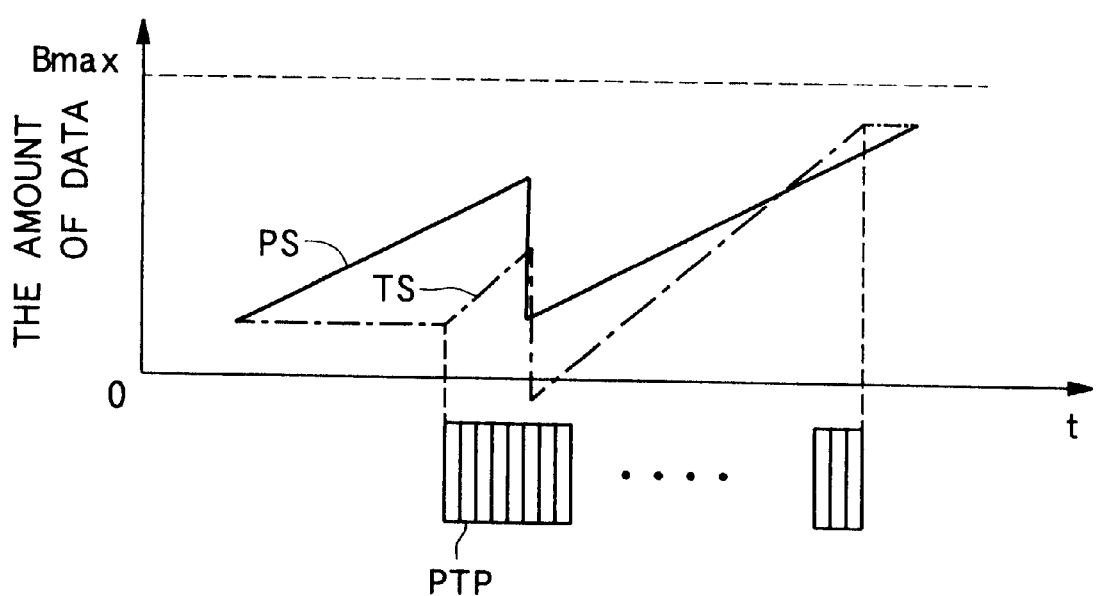
FIG. 18B is a diagram showing changes of the amount of data accumulated in a transport buffer in the condition that lack of data occurs in the transport buffer.

FIG. 18B shows a state that lack of data occurs in the buffer for the TS. If a timing at which picture is output cannot be expected in the PS and TS, there is a possibility that lack of data occurs in the buffer for the TS.

In the PS/TS conversion of the embodiment of the present invention, the PS/TS conversion is performed in such a way that the amount of video data accumulated in the buffer for the TS is always greater than that of in the buffer for the PS, in order to prevent lack of data in the buffer for the TS. As for the audio data, the PS/TS conversion of the embodiment of the present invention is performed in the same manner.

Figure 19A:
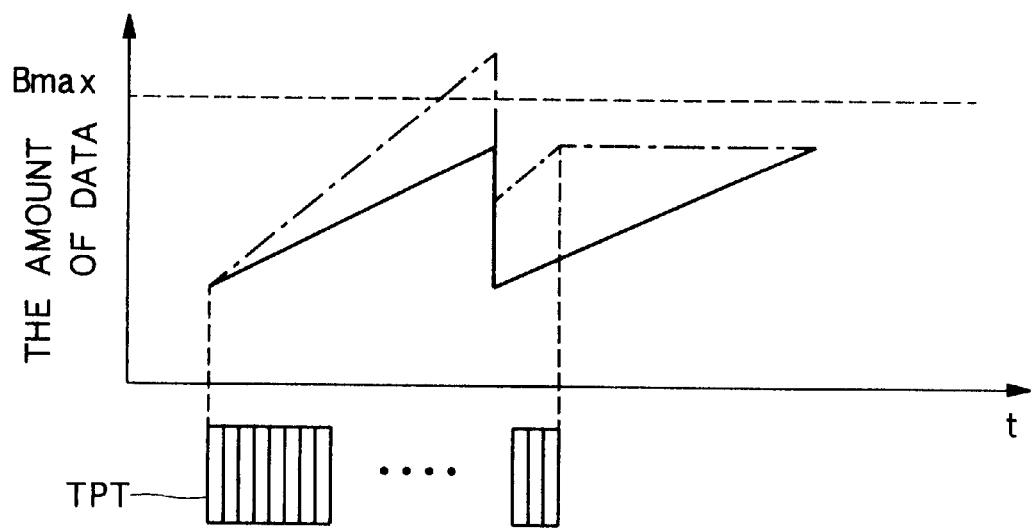
FIG. 19A is a diagram showing changes of the amount of data accumulated in the transport buffer in the condition that excess of data occurs in the transport buffer.

On the other hand, as shown in FIG. 19A, there is a possibility that excess of data occurs in the buffer for the TS, since the transfer rate of the TS is higher than the transfer rate of PS.

Figure 19B:
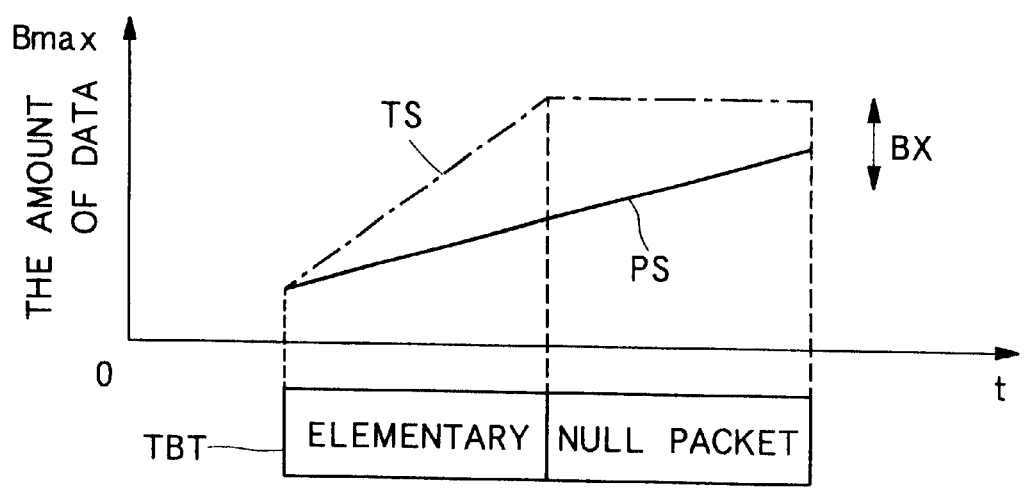
FIG. 19B is a diagram showing a relationship between changes of the amount of data accumulated in a buffer for accumulating a program stream and change of the amount of data accumulated in a transport buffer according to the embodiment of the present invention.

In the PS/TS conversion of the embodiment of the present invention, the increasing rate of data accumulated in the buffer for the TS is adjusted by inserting the NULL packet into the TS, on the basis of the difference between the amount of data accumulated in the buffer for the PS and that in the buffer for the TS, as shown in FIG. 19B. Therefore, the range of the difference between the amount of data accumulated in these buffers is determined as follows.

As stated above, it is needed to maintain the state that the amount of data accumulated in the buffer for the TS is greater than that in the buffer for the PS.

When the NULL packet and the TS packet TPT containing the dummy data are sequentially located in the TS, an input of the data into the buffer for the TS is suspended during the time corresponding to two packets.

In this case, to meet the aforementioned requirement (to maintain the state that the amount of data accumulated in the buffer for the TS is greater than that in the buffer for the PS), it is needed to restrict the difference between the amount of data accumulated in the buffer for the PS and that in the buffer for the TS, as follows:

$$Bx \geq (Rps/Rts) \times (Sp \cdot N) \text{ (bytes)},$$

where "Bx" denotes the difference between data accumulated in the buffer for the TS and that in the buffer for the PS, "Rps" denotes the transfer rate of the PS, "Rts" denotes the transfer rate of the TS, "Sp" denotes the length of the TS packet, and "N" denotes the number of the TS packet. In addition, the "N" may be determined in consideration of a period of time during which supplying data to the buffer for the TS is suspended, characteristics and regulations of the PS and TS, the capacity of the buffer for the TS, and the like.

In the embodiment, the length of the TS packet is 188 bytes. Therefore, the "Sp" is 188. Further, the input of the data into the buffer for the TS is suspended during the time period corresponding to two packets. Therefore, the "N" is "2". Accordingly, $$Bx \geq (Rps/Rts) \times (188 \times 2) \text{ (bytes)}.$$

Meanwhile, as stated above, the capacity of each of the transport buffers 73 and 76 is 512 bytes. Therefore, in order to prevent excess of data in the transport buffers 73 and 76, it is preferable that the difference between data accumulated in the buffer for the TS and that in the buffer for the PS is equal to or less than 512 bytes. Accordingly, it is possible to prevent both lack of data and excess of data in the buffer for the TS, if the difference Bx is within the range of:

$$(Rps/Rts) \times (188 \times 2) \leq Bx \leq 512 \text{ (bytes)}.$$

As stated above, "Rps" is 10.08 Mbps, and "Rts" is 19.39 Mbps.

Therefore, $$(10.08/19.39) \times 188 \times 2 \approx 196$$

Accordingly, $$196 \text{ bytes} \leq Bx \leq 512.$$

Furthermore, when data of the PS is produced, tolerances are set with respect to control of buffers in many case. For example, the upper limit lower than the actual upper limit by a tolerance and the lower limit higher than the actual lower limit by a tolerance are set, and the capacity of the buffer is defined on the basis of the difference between these limits. From this point of view, the range of the difference Bx can be made broader, as follows:

$$(Rps/Rts) \times (188 \times 2) - BmI \leq Bx \leq 512 + Bmu,$$

and concretely, $$196 - BmI \leq Bx \leq 512 + Bmu,$$

where "Bmu" denotes the tolerance of the upper limit, and "BmI" denotes the tolerance of the lower limit.

In addition, when the navi pack 41 is discarded in converting the PS in the TS, there is a case where a blank of data is produced. If the length of the blank of data exceeds 188 bytes, the NULL packet is inserted into the TS in order to adjust the transfer rate.

Furthermore, DVD 1 uses the PS with a variable rate. Therefore, there is a case where an input of a buffer for the TS is temporarily suspended after converting operation for one certain pack P has been just completed. In this case, the NULL packet is inserted into the TS, if the length of the blank of data exceeds 184 bytes.

If the blank of data become smaller than 184 bytes, the TS packet TPT is placed at once.

Moreover, it is needed to insert the PAT, the PMT and the PCR packet into the TS at predetermined intervals (0.1 or 0.4 second), as stated above. The insertions of the PAT, the PMT and the PCR packet are achieved by replacing the NULL packets with the PAT, the PMT and the PCR packet. Actually, the NULL packets, the PAT, the PMT and the PCR packet are alternatively inserted into the TS, according to the aforementioned limitations of the intervals.

For example, when the PAT is inserted into the TS, the NULL packet is replaced with the PAT at 50 milliseconds intervals. When the PCR packet is inserted into the TS, the NULL packet is also replaced with the PCR packet at 50 milliseconds intervals. When the PMT is inserted into the TS, the NULL packet is replaced with the PMT at 200 millisecond intervals. The measurement of time can be easily done by using information obtained from processes of setting the PCR.

In addition, the PAM, the PMT and the PCR packet are placed into the TS, when the PS/TS conversion is started. That is, the PAM, the PMT and the PCR packet are placed into the TS before the first packet containing data obtained from the PES packet.

Meanwhile, the controller 94 includes nine registers, namely: an SCR1 register, an SCR2 register, a PCR register, a PDLEN (Packet Data Length) register, a PS buffer register, a TS buffer register, a PCR interval register, a PAT interval register, and a PMT interval register.

Each of the SCR1 register and the SCR2 register stores the value of the SCR in the PS. The PCR register stores the value of the PCR of the TS packet TPT. The PDLEN register stores the length of data in the PS to be sent. The PS buffer register stores expectation values representing the amounts of data accumulated in the buffers for the PS. The TS buffer register stores expectation values representing the amounts of data accumulated in the buffers for the TS.

Figure 20:
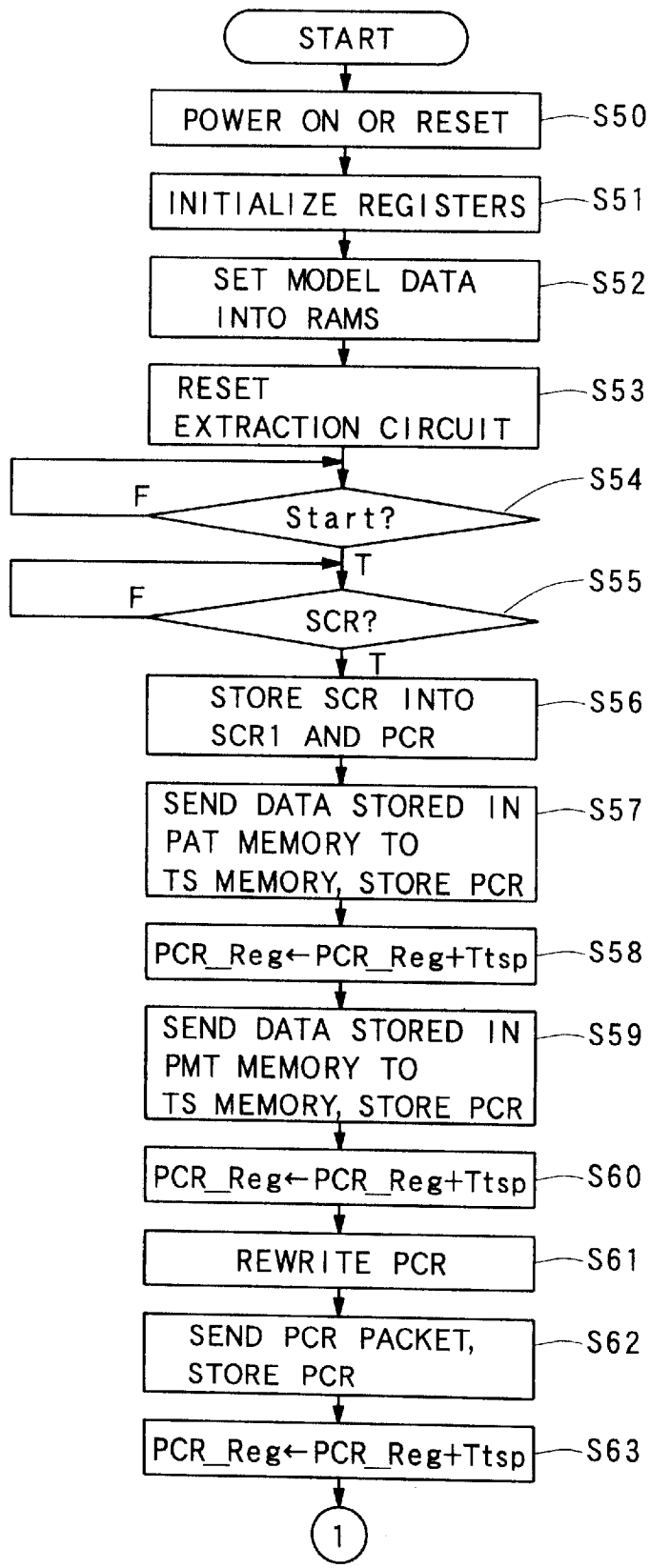
FIG. 20 is a flowchart showing an initializing process executed by a controller of the PS/TS converter of the embodiment of the present invention.
Figure 21:
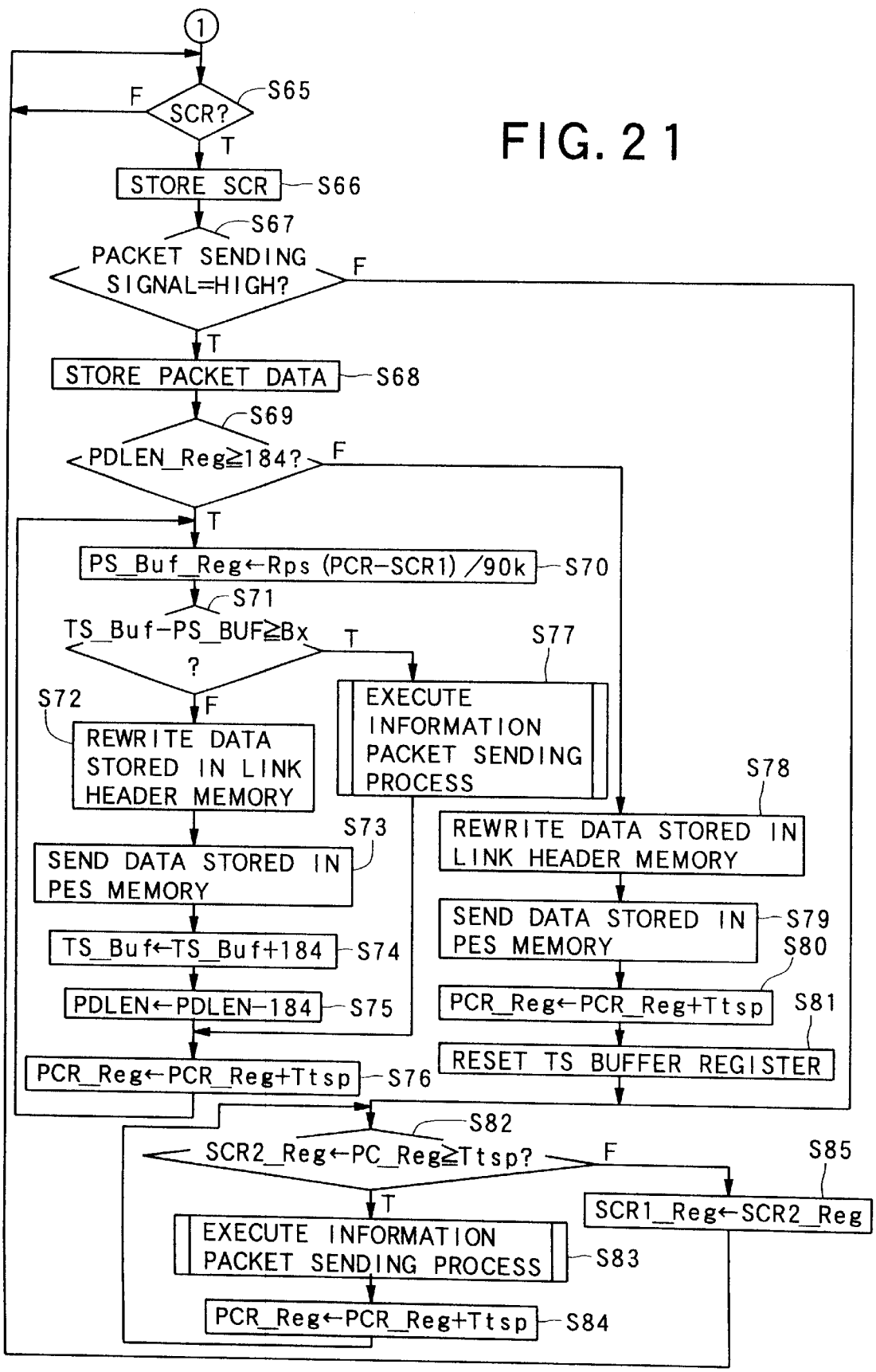
FIG. 21 is a flowchart showing a main operation of the controller.
Figure 22:
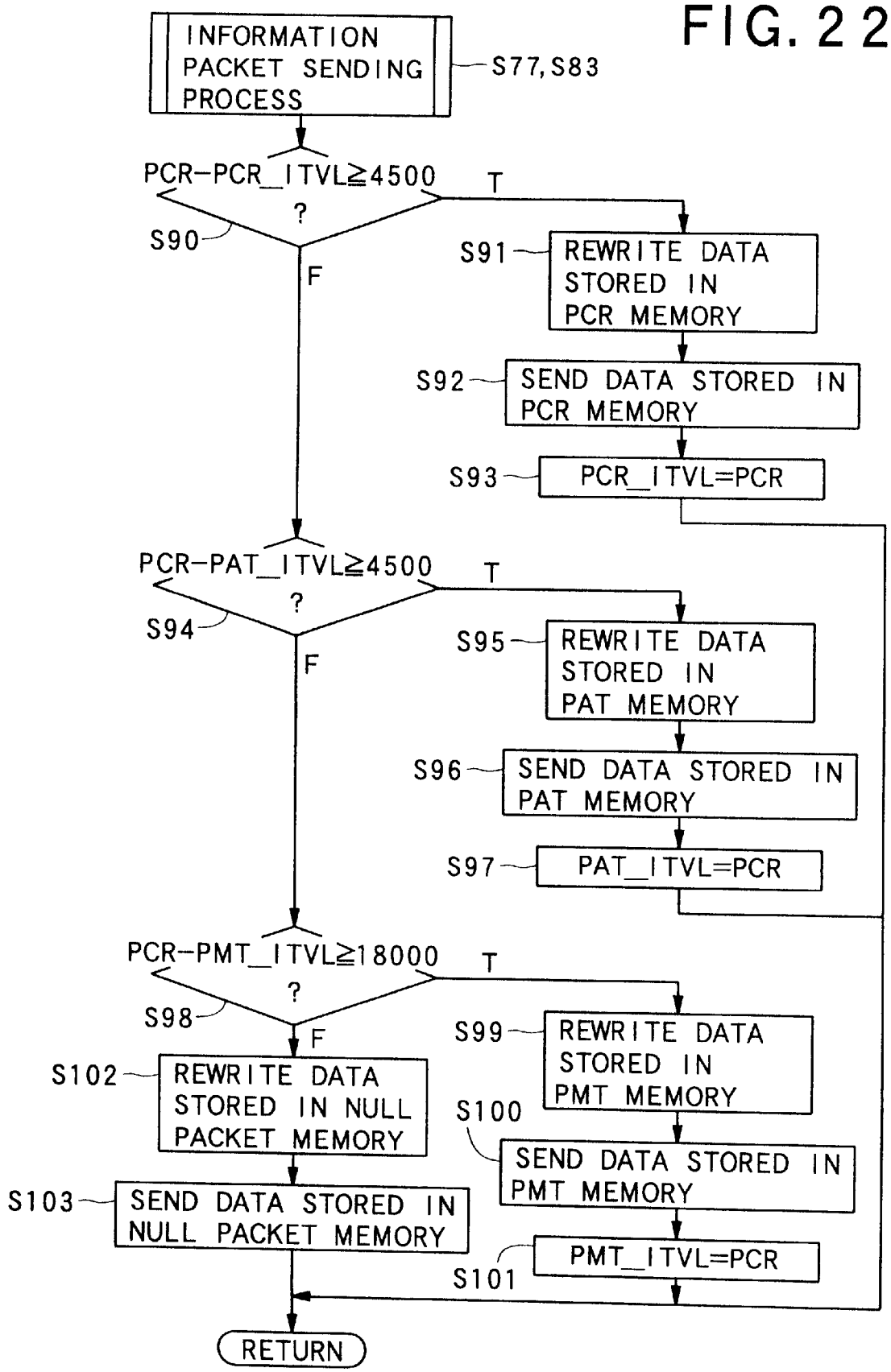
FIG. 22 is a flowchart showing an information packet sending process executed by the controller.

Referring next to FIGS. 20 through 22, an operation of the controller 94 will be described.

FIG. 20 is a flowchart showing an operation of the controller 94 when starting the PS/CS conversion. In FIG. 20, after the controller 94 is enabled or reset (step S50), the controller 94 initializes all of the registers (step S51), and then the aforementioned typical data is stored into memories 89–93 (step S52).

After this, the controller 94 resets the extraction circuit 86 (step S53), and next determines on the basis of the start signal Sst supplied from the extraction circuit 86 whether or not the start code contained in the navi pack 41 is input (step S54). If not, the controller 94 waits until the start code is input. If the start code is input, the controller 94 recognizes that the navi pack 41 is received. Then, the controller 94 receives the SCR signal Sscr representing the SCR contained in the navi pack 41, and then stores this signal into the SCR1 register and the PCR register (steps S55 and S56). Further, the controller 94 sends information stored in the PAT memory 92 to the TS memory 97 by using DMA technique, and stores the present value of the PCR into the PAR interval register (step S57). Thereafter, the controller 94 increases the value of the PCR register by the value representing a time period Ttsp (step S58).

The controller 94 sends information stored in the PMT memory 93 to the TS memory 97 by using DMA technique, and stores the value of the PCR into the PMT interval register (step S59). Thereafter, the controller 94 increases the present value of the PCR register by the value representing the time period Ttsp (step S60).

The time period Ttsp is the time period necessary for sending one TS packet TPT. The time period Ttsp is measured on the basis of the clock with a frequency of 90 kHz, namely:

$$Ttsp=(188\times 8)\times 90000/Rts$$

The controller 94 next sets the present value of the PCR register into the PCR memory 91 (step S61), and sends the PCR packet. At this time, the controller 94 stores the present value of the PCR into the PCR interval register (step S62). Thereafter, the controller 94 increases the value of the PCR register by the time period Ttsp (step S63).

In FIG. 21, the controller 94 next receives the next value of the SCR according to the SCR signal Sscr (step S66), and stores this value into the SCR2 register (step S66).

At this stage, the start time point of the navi pack 41 is stored in the SCR1 register, and the ending time point of the navi pack 41 is stored in the SCR2 register.

Next, the controller 94 confirms reception of the packet sending signal (step S67). At this stage, the state of the packet sending signal is not the HIGH state, because the pack P is the navi pack 41 immediately after the start signal Sst is input. Therefore, the controller 94 next determines whether or not the difference between the value of the PCR register and the value of the SCR2 register is equal to or greater than the value corresponding to the time period Ttsp (step S82). If so, the controller 94 sends information packets to the TS memory 97 (step S83), and increases the value of the PCR register by the value corresponding to the time period Ttsp (step S84). Further, the controller 94 repeatedly executes steps S82 through S84 until the difference between the value of the PCR register and the value of the SCR2 register becomes smaller than the value corresponding to the time period Ttsp. The information packet means the PCR packet, the PAT, the PMT or the NULL packet.

If the difference between the value of the PCR register and the value of the SCR2 register is smaller than the value corresponding to the time period Ttsp, the controller 94 replaces the value of the SCR1 register with the value of the SCR2 register (step S85).

At step S67, on the other hand, if the state of the packet sending signal Spdt is the HIGH state, the controller 94 stores the packet length signal Spdl into the PDLEN register (step S68). As stated above, the packet length signal Spdl is a signal showing the number of bytes of the data which has been sent to the PES memory 88.

The controller 94 next determines whether or not the value of the PDLEN register is equal to or greater than 184 (step S69). If so, the controller 94 calculates the amount of data accumulated in the buffer for the PS, and stores the value Dp corresponding to the calculated amount into the PS buffer register (step S70). This value Dp is calculated as follows:

$$Dp=Rps\times (PCR-SCR1)/90000,$$

where "PCR" denotes the value of the PCR, and "SCR1" denotes the value of the SCR1 register.

The controller 94 next determines whether or not the difference between the value of the TS buffer register and the value of the PS buffer register (the result obtained by subtracting the value of the PS buffer register from the value of the TS buffer register) is equal to or greater than the aforementioned limitation value Bx (step S71). If so, the controller 94 sends the information packet to the TS memory 97 (step S77), and thereafter, increase the value of the PCR register by the value corresponding to time period Ttsp (step S76), and then, the process returns to step S69.

If the difference between the value of the TS buffer register and the value of the PS buffer register is smaller than the limitation value Bx, the controller 94 sets suitable data into the link header memory 89 in order to prepare to generate the link header 71, and sends the data (4 bytes) from the link header memory 89 to the TS memory 97 (step S72). Next, the controller 94 continuously sends data stored in the PES memory 88 to the TS memory 97 by 184 byte (step S73).

The controller 94 next increases the value of the TS buffer register by 184 (step S74), and decreases the value of the PDLEN register by 184 (step S75). Further, the controller 94 increases the value of the PCR register by the value corresponding to time period Ttsp (step S76), and then, the process returns to step S69.

At step S69, on the other hand, if the value of the PDLEN register is smaller than 184 byte, the controller 94 sets dummy data into the link header memory 89 in order to prepare to send the dummy data, and sends the dummy data from the link header memory 89 to the TS memory 97 (step S78). At this time, the number Nd of byte of the dummy data is calculated as follows:

$$Nd=4+184-PDLEN,$$

where "PDLEN" denotes the value of the PDLEN register.

Next, the controller 94 sends data stored in the PES memory 88 to the TS memory 97 by the amount indicated by the PDLEN register (step S79). Thus, 188 bytes data to produce the TS packet TPT is sent to the TS memory 97.

The controller 94 next increases the value of the PCR register by the value corresponding to the time period Ttsp (step S80). Further, the controller 94 resets the TS buffer register (step S81).

In addition, there is a possibility that a dummy packet is contained in the PS. In this case, insertion of the aforementioned information packets is done.

FIG. 22 is a flowchart showing details of the process of sending the information packet to the TS memory 97 (step S77 or 83 in FIG. 21). As stated above, the information packets, such as the PCR packet, the PAT and the PMT, are inserted in the TS at the predetermined intervals. Such insertions are carried out by the steps shown in FIG. 22.

Firstly, the controller 94 determines whether or not the difference between the value of the PCR register and the value of the PCR interval register is equal to or greater than 4500 (step S90). In addition, "4500" represents 50 milliseconds on the time base of 90 kHz. This value is calculated as follows:

$$90000 \times 0.05 = 4500,$$

If the difference between the value of the PCR register and the value of the PCR interval register is equal to or greater than 4500, the controller 94 sets suitable data into the PCR memory 91 in order to prepare to generate the PCR packet (step S91), and sends the data from the PCR memory 91 to the TS memory 97 by 188 bytes (step S92). Further, the controller 94 replaces the value of the PCR interval register with the present value of the PCR register (step S93), and then, the process returns to the main process in FIG. 21.

At step S90, if the difference between the value of the PCR register and the value of the PCR interval register is smaller than 4500, the controller 94 next determines whether or not the difference between the value of the PCR register and the value of the PAT interval register is equal to or greater than 4500 (50 milliseconds) (step S94). If so, the controller 94 sets suitable data to the PAT memory 92 in order to prepare to generate the PAT (step S95), and the data from the PAT memory 92 to the TS memory 97 by 188 bytes (step S96). Further, controller 94 replaces the value of the PAT interval register with the present value of the PCR register (step S97), and then, the process returns to the main process in FIG. 21.

At step S94, if the difference between the value of the PCR register and the value of the PAT interval register is smaller than 4500, the controller 94 next determines whether or not the difference between the value of the PCR register and the value of the PMT interval register is equal to or greater than 18000 (0.2 second) (step S98). "18000" is calculated as follows:

$$90000 \times 0.2 = 18000$$

If the difference between the value of the PCR register and the value of the PMT interval register is equal to or greater than 18000, the controller 94 sets suitable data into the PMT memory 93 in order to prepare to generate the PMT (step S99), and sends the data from the PMT memory 93 to the TS memory 97 by 188 bytes (step S100). Further, controller 94 replaces the value of the PMT interval register with the present value of the PCR register (step S101), and then, the process returns to the main process in FIG. 21.

At step S98, on the other hand, if the difference between the value of the PCR register and the value of the PMT interval register is smaller than 18000, the controller 94 sets suitable data into the NULL packet memory 90 in order to prepare to generate the NULL packet (step S102), and sends the data from the NULL packet memory 90 to the TS memory 97 by 188 bytes (step S103). Thereafter, the process returns to the main process in FIG. 21.

Figure 23:
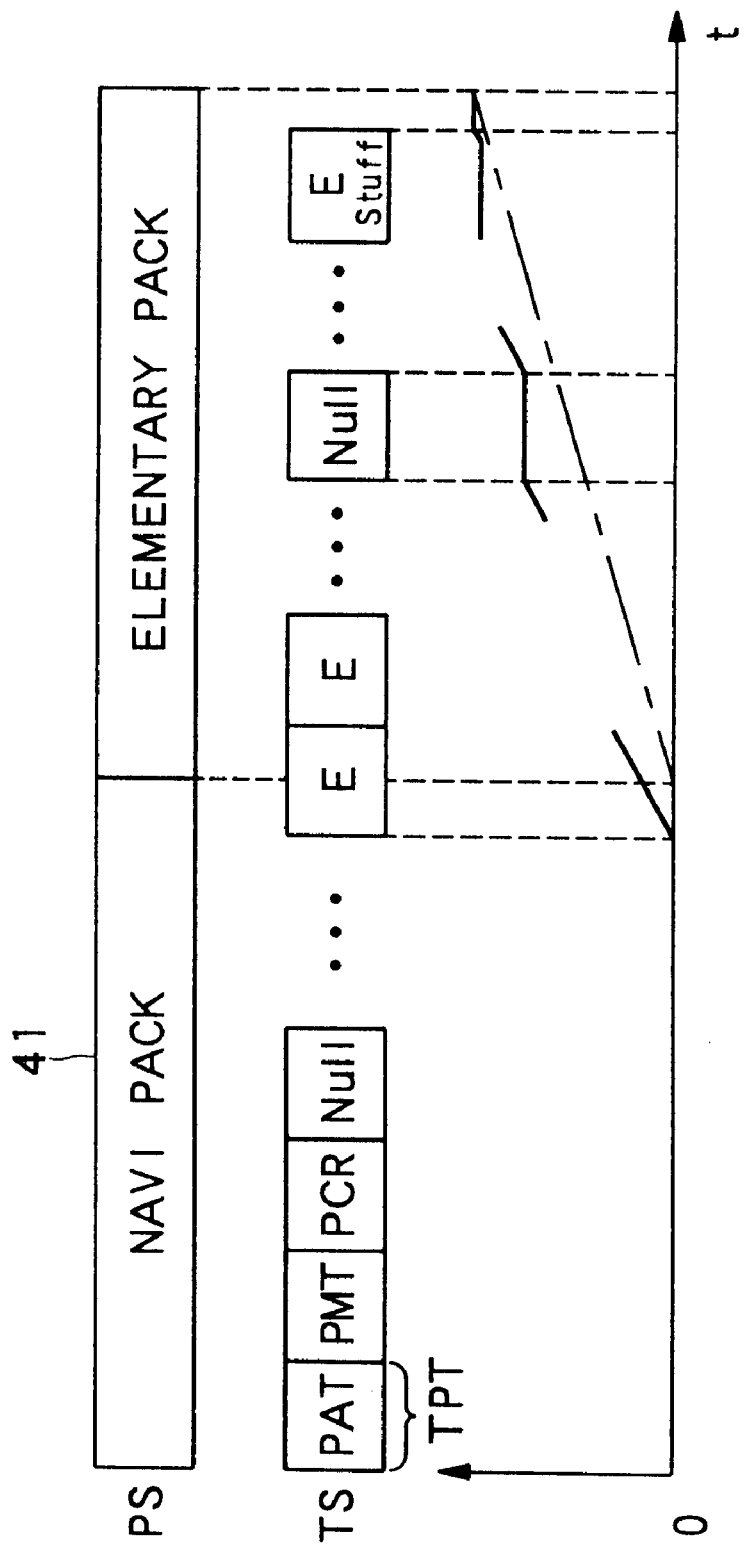
FIG. 23 is a diagram showing a converted transport stream compared with a program stream and changes of the amount of data accumulated in the transport buffer, according to the embodiment of the present invention.

FIG. 23 schematically shows the TS converted by the aforementioned PS/TS conversion, comparing the PS.

As shown in FIG. 23, the information packets such as the PAT, PMT and PCR packet are located in the area corresponding to the navi pack 41, and the packets containing audio data, video data or dummy data, and the NULL packet are located in the area corresponding to the elementary pack such the video pack 42 or the audio pack 43.

The amount of data accumulated in the transport buffer 73 is increased when the packets containing video data is received. The changes of the amount of data accumulated in the transport buffer 73 is shown by the solid line in the graph in FIG. 23. The amount of data accumulated in the video buffer 67 is gradually increased at a constant increasing rate when conversion of the elementary pack is started. The change of the amount of data accumulated in the video buffer 67 is shown by the dashed line in the graph in FIG. 23.

On the other hand, the amount of data accumulated in the transport buffer 73 is not increases when the packet containing the PAT, the PMT or the PCR, or the NULL packet is received.

Figure 24:
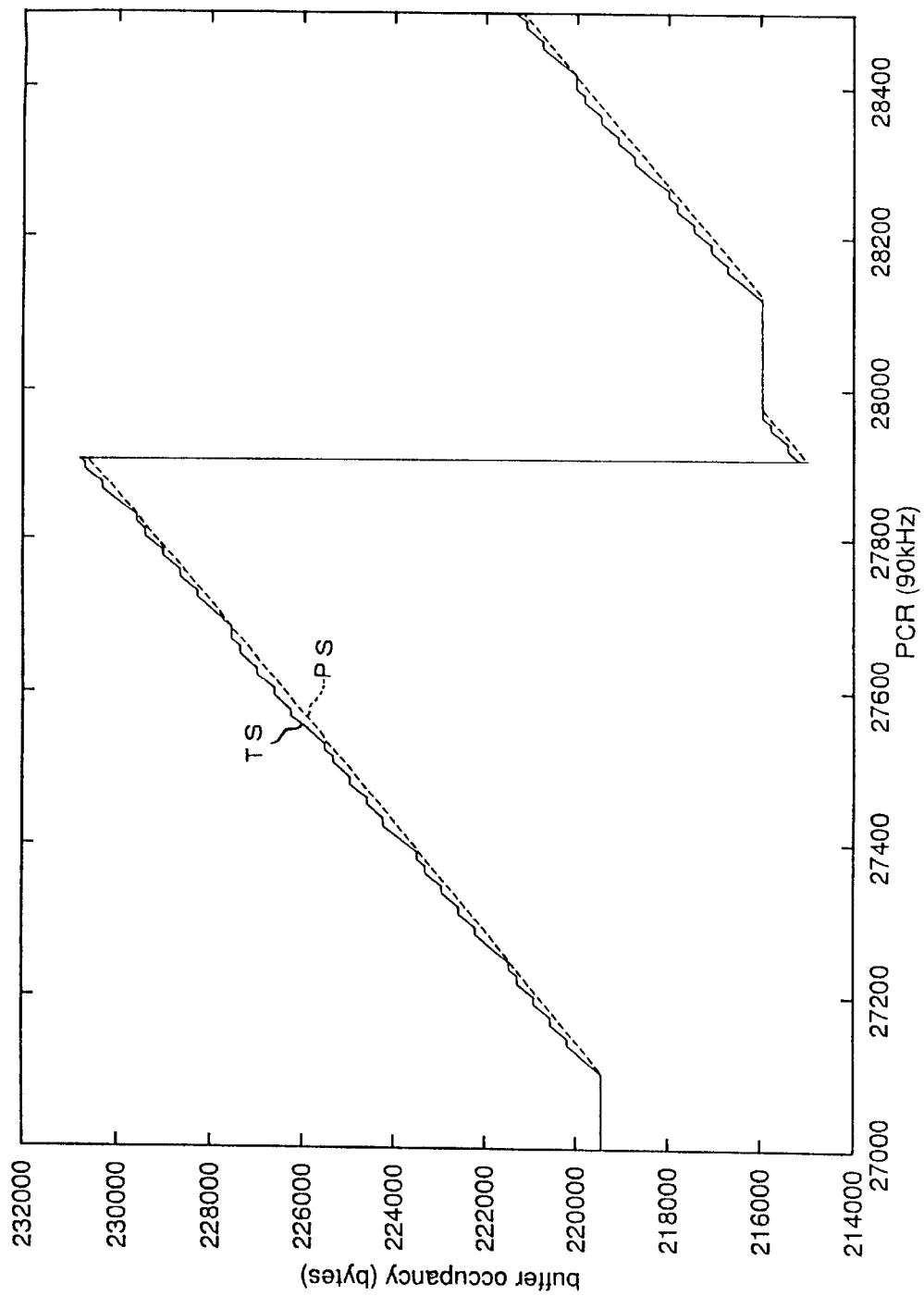
FIG. 24 is a diagram showing changes of the amount of data accumulated in the transport buffer and changes of the amount of data accumulated in the buffer for accumulating a program stream.

FIG. 24 actually shows the changes of the amount of data accumulated in the transport buffer 73 (solid line) and the change of the amount of data accumulated in the video buffer 67 (dashed line). As seen from this diagram, the amount of data accumulated in the transport buffer 73 is always greater than that in the video buffer 67.

As can be understood from the above, according to the PS/TS converter 84, the PS/TS conversion can be performed without lack of data or excess of data in the buffer for the TS. Therefore, it can be prevented that the PS/TS conversion is suspended due to occurrence of lack of data or excess of data in the buffer for the TS. Accordingly, the PS can be directly converted into the TS without rewriting the time management information such as PTS and DTS.

Further, the PS/TS converter 84 converts the PS into the TS by inserting the dummy data into the TS. Therefore, the PS can be easily converted into the TS.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 1096445 filed on Apr. 8, 1998 including the specification, claims, drawings and summary is incorporated herein by reference in its entirety.

What is claimed is:

1. An apparatus for converting a first data stream supplied from a first buffer for accumulating the first data stream into a second data stream, and supplying the second data stream to a second buffer for accumulating the second data stream, the first data stream comprising a plurality of first data groups, each of the plurality of first data groups including significant data, the first data stream including a plurality of time values, the plurality of time values each indicating a point of time corresponding to a position of respective one of the plurality of first data groups within the first data stream, a transfer rate of the second data stream being higher than a transfer rate of the first data stream, the apparatus comprising:

(a) a first determining device for determining a first amount of the first data stream accumulated in the first buffer on the basis of at least one of the plurality of time values;

(b) a second determining device for determining a second amount of the second data stream accumulated in the second buffer on the basis of an amount of the second data stream that is supplied to the second buffer;

(c) a calculation device for calculating a difference between the first amount and the second amount by subtracting the first amount from the second amount;

(d) a first placing device for placing the significant data extracted from the first data stream supplied from the first buffer, into the second data stream, if the difference is smaller than a predetermined value; and (e) a second placing device for placing an additional data into the second data stream, if the difference is not smaller than the predetermined value.

2. The apparatus according to claim 1, wherein the first determining device comprises:

an extraction device for extracting one of the plurality of time values from the first data stream supplied from the first buffer;

a time measuring device for measuring an elapsed time from a point of time at which the extraction device extracts the time value; and an amount calculation device for calculating the first amount by using the extracted time value and the measured elapsed time.

3. The apparatus according to claim 1, wherein the second determining device comprises:

a storing device for storing a value representing the amount of the second data stream that is supplied to the second buffer.

4. An apparatus for converting a program stream supplied from a first buffer for accumulating the program stream into a transport stream, and supplying the transport stream to a second buffer for accumulating the transport stream, both the program stream and the transport stream being standardized by MPEG2 (Moving Picture Experts Group 2), the program stream comprising a plurality of first data groups, the program stream comprising a plurality of first packets, each of the plurality of first packets including significant data, the program stream including a plurality of SCRs (System Clock References), the transport stream comprising a plurality of second packets and a plurality of information packets, the apparatus comprising:

(a) a first determining device for determining a first amount of the program stream accumulated in the first buffer on the basis of at least one of the plurality of SCRs;

(b) a second determining device for determining a second amount of the transport stream accumulated in the second buffer on the basis of an amount of the transport stream that is supplied to the second buffer;

(c) a calculation device for calculating a difference between the first amount and the second amount by subtracting the first amount from the second amount;

(d) a first placing device for placing the significant data extracted from the program stream supplied from the first buffer, into one of the plurality of second packets in the transport stream, if the difference is smaller than a predetermined value; and (e) a second placing device for placing one of the plurality of information packets into the transport stream, if the difference is not smaller than the predetermined value.

5. The apparatus according to claim 4, wherein the first determining device comprises:

an extraction device for extracting one of the plurality of SCRs from the program stream supplied from the first buffer;

a time measuring device for measuring an elapsed time from a point of time at which the extraction device extracts the SCR; and an amount calculation device for calculating the first amount by using the extracted SCR and the measured elapsed time.

6. The apparatus according to claim 4, wherein the second determining device comprises:

a storing device for storing a value representing the amount of the second data stream that is supplied to the second buffer.

7. The apparatus according to claim 4, wherein the predetermined value Bx is within a range of:

$$(Rps/Rts) \cdot (Sp \cdot N) \leq Bx \leq C,$$

where the Rps denotes a transfer rate of the program stream, the Rts demotes a transfer rate of the transport stream, the Sp denotes a size of the second packet, the N denotes a predetermined number, and the C denotes a capacity of the second buffer.

8. The apparatus according to claim 4, wherein any one of the plurality of information packets includes a PAT (Program Association Table).

9. The apparatus according to claim 4, wherein any one of the plurality of information packets includes a PMT (Program Map Tables).

10. The apparatus according to claim 4, wherein any one of the plurality of information packets includes insignificant data.

* * * * *